United States Patent
Huang et al.

(10) Patent No.: US 10,244,400 B2
(45) Date of Patent: Mar. 26, 2019

(54) SERVICE DATA TRANSMISSION METHOD AND APPARATUS

(71) Applicant: HUAWEI TECHNOLOGIES CO., LTD., Shenzhen, Guangdong (CN)

(72) Inventors: Qufang Huang, Shanghai (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/667,797

(22) Filed: Aug. 3, 2017

(65) Prior Publication Data

US 2017/0332245 A1   Nov. 16, 2017

Related U.S. Application Data

(63) Continuation of application No. PCT/CN2015/072289, filed on Feb. 5, 2015.

(51) Int. Cl.
*H04W 36/00* (2009.01)
*H04W 72/00* (2009.01)
(Continued)

(52) U.S. Cl.
CPC .......... *H04W 16/14* (2013.01); *H04W 28/20* (2013.01); *H04W 36/0072* (2013.01);
(Continued)

(58) Field of Classification Search
CPC ..... H04W 16/14; H04W 52/40; H04W 28/20; H04W 24/02; H04B 1/7103
See application file for complete search history.

(56) References Cited

U.S. PATENT DOCUMENTS 9,860,818 B2 * 1/2018 Tapia ................. H04W 36/365
2004/0077366 A1 * 4/2004 Panasik ............. H04L 1/0023
455/514
(Continued)

FOREIGN PATENT DOCUMENTS

CN    103517456 A    1/2014
CN    103765824 A    4/2014
(Continued)

OTHER PUBLICATIONS

International Search Report dated Oct. 29, 2015 in corresponding International Patent Application No. PCT/CN2015/072289.
(Continued)

*Primary Examiner* — Ajit Patel
(74) *Attorney, Agent, or Firm* — Staas & Halsey LLP

(57) ABSTRACT

Embodiments of the present invention provide a service data transmission method and an apparatus, and relate to the communications field, so as to resolve a problem that spectrum utilization in the prior art is relatively low. The method includes: obtaining, by a base station, use permission of at least one first spectrum; broadcasting, by the base station, a service migration message to a terminal by using a second spectrum, where the service migration message is used to instruct the terminal to receive service data on the at least one first spectrum; and sending, by the base station, the service data to the terminal by using the at least one first spectrum. The embodiments of the present invention are applicable to a case in which a base station sends service data to a terminal.

17 Claims, 6 Drawing Sheets

(51) Int. Cl.
*H04W 36/16* (2009.01)
*H04W 16/14* (2009.01)
*H04W 28/20* (2009.01)
*H04W 52/40* (2009.01)
*H04B 1/7103* (2011.01)
*H04W 24/02* (2009.01)

(52) U.S. Cl.
CPC ........... *H04W 52/40* (2013.01); *H04B 1/7103* (2013.01); *H04W 24/02* (2013.01); *H04W 36/165* (2013.01); *H04W 72/005* (2013.01)

(56) References Cited

U.S. PATENT DOCUMENTS

| | | | |
|---|---|---|---|
| 2006/0258363 A1* | 11/2006 | Masuda | H04W 72/10 455/450 |
| 2011/0002405 A1 | 1/2011 | Raveendran | |
| 2012/0099509 A1 | 4/2012 | Ai et al. | |
| 2013/0029606 A1* | 1/2013 | Wang | H04W 16/30 455/62 |
| 2013/0195003 A1 | 8/2013 | Lee et al. | |
| 2013/0273952 A1* | 10/2013 | Srikanteswara | H04W 16/14 455/509 |
| 2013/0301509 A1 | 11/2013 | Purnadi et al. | |
| 2014/0036853 A1 | 2/2014 | Kim et al. | |
| 2014/0086208 A1 | 3/2014 | Murray et al. | |
| 2014/0376483 A1 | 12/2014 | Hong et al. | |
| 2014/0378157 A1 | 12/2014 | Wei et al. | |
| 2015/0009962 A1 | 1/2015 | Clegg | |
| 2015/0305045 A1* | 10/2015 | Tapia | H04W 84/18 370/329 |
| 2015/0334574 A1* | 11/2015 | Krishnamoorthy | H04W 16/14 370/329 |
| 2015/0334575 A1* | 11/2015 | Joshi | H04W 72/0453 370/329 |
| 2015/0350993 A1* | 12/2015 | Kasten | H04W 48/16 370/332 |
| 2016/0088485 A1* | 3/2016 | Guo | H04W 16/14 370/329 |

FOREIGN PATENT DOCUMENTS

| | | |
|---|---|---|
| JP | 2011024213 A | 2/2011 |
| JP | 2012530417 A | 11/2012 |
| JP | 2013541306 A | 11/2013 |
| KR | 10-2014-0010450 | 1/2014 |
| KR | 10-2014-0022383 | 2/2014 |
| WO | 2013/116998 A1 | 8/2013 |
| WO | 2013/131257 A1 | 9/2013 |
| WO | 2014161491 A1 | 10/2014 |

OTHER PUBLICATIONS

Fujitsu, *DL long-CP sub-frame*, 3GPP TSG-RAN-WG1 Meeting #46, R1-062394, Tallin, Estonia, Aug. 28-Sep. 1, 2006, XP050102912 (6 pp.).

NEC Group, *Issue of dynamic CP length change in a cell with mixed unicast and MBMS transmission*, RAN WG1 meeting 47bis, R1-070357, Sorrento, Italy, Jan. 15-19, 2007, XP050104391 (8 pp.).

Extended European Search Report, dated Dec. 19, 2017, in European Application No. 15880728.9 (12 pp.).

International Search Report dated Oct. 29, 2015 in corresponding International Publication No. PCT/CN2015/072289.

Japanese Office Action for Japanese Patent Application No. 2017-541322 dated Sep. 4, 2018.

Korean Office Action dated Jan. 18, 2018 in corresponding Korean Patent Application No. 10-2017-7024478.

* cited by examiner

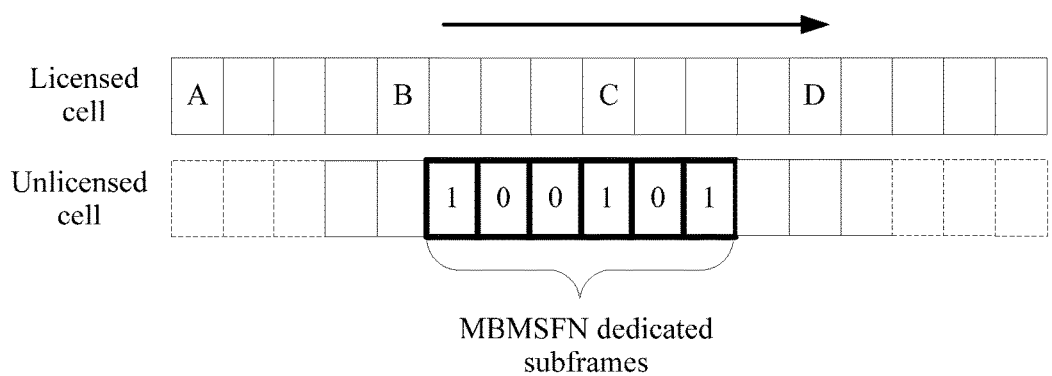

FIG. 7

```
┌─────────────────────────────────────────────────────────────┐
│ A terminal receives a service migration message that is     │
│ broadcast by a base station by using a second spectrum,     │──── S801
│ where the service migration message is used to instruct     │
│ the terminal to receive service data on at least one        │
│ first spectrum                                              │
└─────────────────────────────────────────────────────────────┘
                              │
                              ▼
┌─────────────────────────────────────────────────────────────┐
│ The terminal receives, according to the service migration   │
│ message, the service data that is sent by the base station  │──── S802
│ by using the at least one first spectrum                    │
└─────────────────────────────────────────────────────────────┘
```

FIG. 8

SERVICE DATA TRANSMISSION METHOD AND APPARATUS

CROSS-REFERENCE TO RELATED APPLICATIONS

This application is a continuation of International Application No. PCT/CN2015/072289, filed on Feb. 5, 2015, the disclosure of which is hereby incorporated by reference in its entirety.

TECHNICAL FIELD

The present invention relates to the communications field, and in particular, to a service data transmission method and an apparatus.

BACKGROUND

In the prior art, for a terminal that is simultaneously covered by multiple cells, a base station usually sends service data to the terminal by using only a spectrum occupied by a primary cell. When a resource of the spectrum occupied by the primary cell is relatively poor, for example, radio signal strength of the spectrum is relatively weak, and network uplink and downlink rates are relatively low, or when congestion occurs during service data transmission by the base station in the primary cell, how to use a spectrum occupied by another cell to send service data is not considered in the prior art. It can be learned that spectrum utilization in the prior art is relatively low.

SUMMARY

The present invention provides a service data transmission method and an apparatus, to resolve a prior-art problem of relatively low spectrum utilization.

To achieve the foregoing objective, embodiments of the present invention use the following technical solutions.

According to a first aspect, a service data transmission method is provided, including:

obtaining, by a base station, use permission of at least one first spectrum;

broadcasting, by the base station, a service migration message to a terminal by using a second spectrum, where the service migration message is used to instruct the terminal to receive service data on the at least one first spectrum; and sending, by the base station, the service data to the terminal by using the at least one first spectrum.

With reference to the first aspect, in a first possible implementation, the service migration message includes frequency information of the at least one first spectrum, a cell identifier of a cell that occupies the at least one first spectrum, and a service identifier of the service data.

With reference to the first aspect or the first possible implementation of the first aspect, in a second possible implementation, the base station obtains use permission of M first spectrums, M is a positive integer greater than or equal to 1, and the sending, by the base station, the service data to the terminal by using the at least one first spectrum specifically includes:

sending, by the base station to the terminal, a scheduling indication message corresponding to the service data, where the scheduling indication message includes a transmission channel identifier of the service data, and the transmission channel identifier is used to indicate a transmission channel on which the service data is transmitted; and sending, by the base station, the service data by using a subframe on the M first spectrums.

With reference to any one of the first aspect, or the first to the second possible implementation of the first aspect, in a third possible implementation, the base station obtains use permission of M first spectrums, M is a positive integer greater than 1, and the sending, by the base station, the service data to the terminal by using the at least one first spectrum specifically includes:

sending, by the base station to the terminal, a scheduling indication message corresponding to the service data, where the scheduling indication message includes a transmission channel identifier of the service data and a cell identifier of an unlicensed cell that occupies N first spectrums, the transmission channel identifier is used to indicate a transmission channel on which the service data is transmitted, the N first spectrums are any N first spectrums in the M first spectrums, N is a positive integer, and 1≤N≤M; and sending, by the base station, the service data by using a subframe on the N first spectrums.

With reference to any one of the first aspect, or the first to the third possible implementation of the first aspect, in a fourth possible implementation, the sending, by the base station, the service data to the terminal by using the at least one first spectrum specifically includes:

sending, by the base station, configuration information of dedicated subframes on the at least one first spectrum and transmission channel information of the service data to the terminal; and sending, by the base station, the service data to the terminal by using the dedicated subframes.

With reference to any one of the first aspect, or the first to the fourth possible implementation of the first aspect, in a fifth possible implementation, the configuration information of the dedicated subframes includes a time period occupied by the dedicated subframes or a quantity of the dedicated subframes.

With reference to any one of the first aspect, or the first to the fifth possible implementation of the first aspect, in a sixth possible implementation, the configuration information of the dedicated subframes includes a bitmap, and the bitmap is used to indicate a dedicated subframe that carries the service data.

With reference to any one of the first aspect, or the first to the sixth possible implementation of the first aspect, in a seventh possible implementation, the method further includes:

adding, by the base station, indication information to a last subframe in the dedicated subframes, where the indication information is used by the terminal to determine whether to perform blind detection on a subsequent subframe, and the blind detection is used to determine whether the subsequent subframe carries new service data.

With reference to any one of the first aspect, or the first to the seventh possible implementation of the first aspect, in an eighth possible implementation, the service data is multimedia broadcast multicast service MBMS data or unicast service data.

With reference to any one of the first aspect, or the first to the eighth possible implementation of the first aspect, in a ninth possible implementation, the first spectrum is an unlicensed spectrum, and the second spectrum is a licensed spectrum.

According to a second aspect, a service data transmission method is provided, including:

receiving, by a terminal, a service migration message that is broadcast by a base station by using a second spectrum, where the service migration message is used to instruct the terminal to receive service data on at least one first spectrum; and receiving, by the terminal according to the service migration message, the service data that is sent by the base station by using the at least one first spectrum.

With reference to the second aspect, in a first possible implementation, the service migration message includes frequency information of the at least one first spectrum, a cell identifier of a cell that occupies the at least one first spectrum, and a service identifier of the service data.

With reference to the second aspect or the first possible implementation of the second aspect, in a second possible implementation, the base station obtains use permission of M first spectrums, M is a positive integer greater than 1, and the receiving, by the terminal according to the service migration message, the service data that is sent by the base station by using the at least one first spectrum specifically includes:

receiving, by the terminal, a scheduling indication message sent by the base station, where the scheduling indication message includes a transmission channel identifier of the service data, and the transmission channel identifier is used to indicate a transmission channel on which the service data is transmitted;

receiving, by the terminal according to the service migration message, a subframe that is sent by the base station by using the M first spectrums; and obtaining, by the terminal according to the scheduling indication message, the service data carried in the subframe.

With reference to any one of the second aspect, or the first to the second possible implementation of the second aspect, in a third possible implementation, the base station obtains use permission of M first spectrums, M is a positive integer greater than 1, and the receiving, by the terminal according to the service migration message, the service data that is sent by the base station by using the at least one first spectrum specifically includes:

receiving, by the terminal, a scheduling indication message sent by the base station, where the scheduling indication message includes a transmission channel identifier of the service data and a cell identifier of an unlicensed cell that occupies N first spectrums, the transmission channel identifier is used to indicate a transmission channel on which the service data is transmitted, the N first spectrums are any N first spectrums in the M first spectrums, N is a positive integer, and 1≤N≤M;

receiving, by the terminal according to the service migration message, a subframe that is sent by the base station by using the N first spectrums; and obtaining, by the terminal according to the scheduling indication message, the service data carried in the subframe on the N first spectrums.

With reference to any one of the second aspect, or the first to the third possible implementation of the second aspect, in a fourth possible implementation, the receiving, by the terminal according to the service migration message, the service data that is sent by the base station by using the at least one first spectrum specifically includes:

receiving, by the terminal, configuration information of dedicated subframes and transmission channel information of the service data that are sent by the base station; and obtaining, by the terminal according to the service migration message, the configuration information of the dedicated subframes, and the transmission channel information of the service data, the service data carried in the dedicated subframes on the at least one first spectrum.

With reference to any one of the second aspect, or the first to the fourth possible implementation of the second aspect, in a fifth possible implementation, if all the dedicated subframes carry the service data, the configuration information of the dedicated subframes includes a time period occupied by the dedicated subframes or a quantity of the dedicated subframes.

With reference to any one of the second aspect, or the first to the fifth possible implementation of the second aspect, in a sixth possible implementation, the configuration information of the dedicated subframes includes a bitmap, and the bitmap is used to indicate a dedicated subframe that carries the service data.

With reference to any one of the second aspect, or the first to the sixth possible implementation of the second aspect, in a seventh possible implementation, the method further includes: determining, by the terminal according to indication information carried in a last subframe in the dedicated subframes, whether to perform blind detection on a subsequent subframe, and the blind detection is used to determine whether the subsequent subframe carries new service data.

With reference to any one of the second aspect, or the first to the seventh possible implementation of the first aspect, in an eighth possible implementation, the service data is multimedia broadcast multicast service MBMS data or unicast service data.

With reference to any one of the second aspect, or the first to the eighth possible implementation of the first aspect, in a ninth possible implementation, the first spectrum is an unlicensed spectrum, and the second spectrum is a licensed spectrum.

According to a third aspect, a base station is provided, including:

an obtaining unit, configured to obtain use permission of at least one first spectrum;

a message broadcasting unit, configured to broadcast a service migration message to a terminal by using a second spectrum, where the service migration message is used to instruct the terminal to receive service data on the at least one first spectrum; and a data sending unit, configured to send the service data to the terminal by using the at least one first spectrum.

With reference to the third aspect, in a first possible implementation, the service migration message includes frequency information of the at least one first spectrum, a cell identifier of a cell that occupies the at least one first spectrum, and a service identifier of the service data.

With reference to the third aspect or the first possible implementation of the third aspect, in a second possible implementation, the base station obtains use permission of M first spectrums, M is a positive integer greater than 1, and the data sending unit is specifically configured to:

send, to the terminal, a scheduling indication message corresponding to the service data, where the scheduling indication message includes a transmission channel identifier of the service data, and the transmission channel identifier is used to indicate a transmission channel on which the service data is transmitted; and send the service data by using a subframe on the M first spectrums.

With reference to any one of the third aspect, or the first to the second possible implementation of the third aspect, in a third possible implementation, the base station obtains use permission of M first spectrums, M is a positive integer greater than 1, and the data sending unit is specifically configured to:

send, to the terminal, a scheduling indication message corresponding to the service data, where the scheduling indication message includes a transmission channel identifier of the service data and a cell identifier of an unlicensed cell that occupies N first spectrums, the transmission channel identifier is used to indicate a transmission channel on which the service data is transmitted, the N first spectrums are any N first spectrums in the M first spectrums, N is a positive integer, and 1≤N≤M; and send the service data by using a subframe on the N first spectrums.

With reference to any one of the third aspect, or the first to the third possible implementation of the third aspect, in a fourth possible implementation, the data sending unit is specifically configured to:

send configuration information of dedicated subframes on the at least one first spectrum and transmission channel information of the service data to the terminal; and send the service data to the terminal by using the dedicated subframes.

With reference to any one of the third aspect, or the first to the fourth possible implementation of the third aspect, in a fifth possible implementation, the configuration information of the dedicated subframes includes a time period occupied by the dedicated subframes or a quantity of the dedicated subframes.

With reference to any one of the third aspect, or the first to the fifth possible implementation of the third aspect, in a sixth possible implementation, the configuration information of the dedicated subframes includes a bitmap, and the bitmap is used to indicate a dedicated subframe that carries the service data.

With reference to any one of the third aspect, or the first to the sixth possible implementation of the third aspect, in a seventh possible implementation, the data sending unit is specifically configured to:

add indication information to a last subframe in the dedicated subframes, where the indication information is used by the terminal to determine whether to perform blind detection on a subsequent subframe, and the blind detection is used to determine whether the subsequent subframe carries new service data.

With reference to any one of the third aspect, or the first to the seventh possible implementation of the third aspect, in an eighth possible implementation, the first spectrum is an unlicensed spectrum, and the second spectrum is a licensed spectrum.

According to a fourth aspect, a terminal is provided, including:

a message receiving unit, configured to receive a service migration message that is broadcast by a base station by using a second spectrum, where the service migration message is used to instruct the terminal to receive service data on at least one first spectrum; and a data obtaining unit, configured to receive, according to the service migration message, the service data that is sent by the base station by using the at least one first spectrum.

With reference to the fourth aspect, in a first possible implementation, the service migration message includes frequency information of the at least one first spectrum, a cell identifier of a cell that occupies the at least one first spectrum, and a service identifier of the service data.

With reference to the fourth aspect or the first possible implementation of the fourth aspect, in a second possible implementation, the base station obtains use permission of M first spectrums, M is a positive integer greater than 1, and the message receiving unit is further configured to: receive a scheduling indication message sent by the base station, where the scheduling indication message includes a transmission channel identifier of the service data, and the transmission channel identifier is used to indicate a transmission channel on which the service data is transmitted; and receive, according to the service migration message, a subframe that is sent by the base station by using the M first spectrums; and the data obtaining unit is further configured to obtain, according to the scheduling indication message, the service data carried in the subframe.

With reference to any one of the fourth aspect, or the first to the second possible implementation of the fourth aspect, in a third possible implementation, the base station obtains use permission of M first spectrums, M is a positive integer greater than 1, and the message receiving unit is specifically configured to:

receive a scheduling indication message sent by the base station, where the scheduling indication message includes a transmission channel identifier of the service data and a cell identifier of an unlicensed cell that occupies N first spectrums, the transmission channel identifier is used to indicate a transmission channel on which the service data is transmitted, the N first spectrums are any N first spectrums in the M first spectrums, N is a positive integer, and 1≤N≤M; and the data obtaining unit is further configured to: receive, according to the service migration message, a subframe that is sent by the base station by using the N first spectrums; and obtain, according to the scheduling indication message, the service data carried in the subframe on the N first spectrums.

With reference to any one of the fourth aspect, or the first to the third possible implementation of the fourth aspect, in a fourth possible implementation, the message receiving unit is further configured to receive configuration information of dedicated subframes and transmission channel information of the service data that are sent by the base station; and the data obtaining unit is specifically configured to obtain, according to the service migration message, the configuration information of the dedicated subframes, and the transmission channel information of the service data, the service data carried in the dedicated subframes on the at least one first spectrum.

With reference to any one of the fourth aspect, or the first to the fourth possible implementation of the fourth aspect, in a fifth possible implementation, if all the dedicated subframes carry the service data, the configuration information of the dedicated subframes includes a time period occupied by the dedicated subframes or a quantity of the dedicated subframes.

With reference to any one of the fourth aspect, or the first to the fifth possible implementation of the fourth aspect, in a sixth possible implementation, the configuration information of the dedicated subframes includes a bitmap, and the bitmap is used to indicate a dedicated subframe that carries the service data.

With reference to any one of the fourth to the sixth possible implementations of the fourth aspect, in a seventh possible implementation, the terminal further includes a determining unit, configured to determine, according to indication information carried in a last subframe in the dedicated subframes, whether to perform blind detection on a subsequent subframe, where the blind detection is used to determine whether the subsequent subframe carries new service data.

With reference to any one of the fourth to the seventh possible implementations of the fourth aspect, in an eighth possible implementation, the first spectrum is an unlicensed spectrum, and the second spectrum is a licensed spectrum.

According to a fifth aspect, a base station is provided, including: a bus, and a processor, a memory, an input module, and an output module that are connected to the bus, where the memory is configured to store an instruction, and the processor executes the instruction to:

obtain use permission of at least one first spectrum;

broadcast a service migration message to a terminal by using a second spectrum, where the service migration message is used to instruct the terminal to receive service data on the at least one first spectrum; and send the service data to the terminal by using the at least one first spectrum.

With reference to the fifth aspect, in a first possible implementation, the service migration message includes frequency information of the at least one first spectrum, a cell identifier of a cell that occupies the at least one first spectrum, and a service identifier of the service data.

With reference to the fifth aspect or the first possible implementation of the fifth aspect, in a second possible implementation, the base station obtains use permission of M first spectrums, M is a positive integer greater than or equal to 1, and the processor executes the instruction to specifically:

send, to the terminal, a scheduling indication message corresponding to the service data, where the scheduling indication message includes a transmission channel identifier of the service data, and the transmission channel identifier is used to indicate a transmission channel on which the service data is transmitted; and send the service data by using a subframe on the M first spectrums.

With reference to any one of the fifth aspect, or the first to the third possible implementation of the fifth aspect, in a fourth possible implementation, the base station obtains use permission of M first spectrums, M is a positive integer greater than 1, and the processor executes the instruction to specifically:

send, to the terminal, a scheduling indication message corresponding to the service data, where the scheduling indication message includes a transmission channel identifier of the service data and a cell identifier of an unlicensed cell that occupies N first spectrums, the transmission channel identifier is used to indicate a transmission channel on which the service data is transmitted, the N first spectrums are any N first spectrums in the M first spectrums, N is a positive integer, and 1≤N≤M; and send the service data by using a subframe on the N first spectrums.

With reference to any one of the fifth aspect, or the first to the second possible implementation of the fifth aspect, in a third possible implementation, the processor executes the instruction to specifically:

send configuration information of dedicated subframes on the at least one first spectrum and transmission channel information of the service data to the terminal; and send the service data to the terminal by using the dedicated subframes.

With reference to any one of the fifth aspect, or the first to the fourth possible implementation of the fifth aspect, in a fifth possible implementation, the configuration information of the dedicated subframes includes a time period occupied by the dedicated subframes or a quantity of the dedicated subframes.

With reference to any one of the fifth aspect, or the first to the fifth possible implementation of the fifth aspect, in a sixth possible implementation, the configuration information of the dedicated subframes includes a bitmap, and the bitmap is used to indicate a dedicated subframe that carries the service data.

With reference to any one of the fourth to the sixth possible implementations of the fifth aspect, in a seventh possible implementation, the processor executes the instruction to further:

add indication information to a last subframe in the dedicated subframes, where the indication information is used by the terminal to determine whether to perform blind detection on a subsequent subframe, and the blind detection is used to determine whether the subsequent subframe carries new service data.

With reference to any one of the fourth to the seventh possible implementations of the fifth aspect, in an eighth possible implementation, the first spectrum is an unlicensed spectrum, and the second spectrum is a licensed spectrum.

According to a sixth aspect, a terminal is provided, including: a bus, and a processor, a memory, an input module, and an output module that are connected to the bus, where the memory is configured to store an instruction, and the processor executes the instruction to:

receive a service migration message that is broadcast by a base station by using a second spectrum, where the service migration message is used to instruct the terminal to receive service data on at least one first spectrum; and receive, according to the service migration message, the service data that is sent by the base station by using the at least one first spectrum.

With reference to the sixth aspect, in a first possible implementation, the service migration message includes frequency information of the at least one first spectrum, a cell identifier of a cell that occupies the at least one first spectrum, and a service identifier of the service data.

With reference to the sixth aspect or the first possible implementation of the sixth aspect, in a second possible implementation, the base station obtains use permission of M first spectrums, M is a positive integer greater than 1, and the processor executes the instruction to specifically:

receive a scheduling indication message sent by the base station, where the scheduling indication message includes a transmission channel identifier of the service data, and the transmission channel identifier is used to indicate a transmission channel on which the service data is transmitted;

receive, according to the service migration message, a subframe that is sent by the base station by using the M first spectrums; and obtain, according to the scheduling indication message, the service data carried in the subframe.

With reference to any one of the sixth aspect, or the first to the second possible implementation of the sixth aspect, in a third possible implementation, the base station obtains use permission of M first spectrums, M is a positive integer greater than 1, and the processor executes the instruction to specifically:

receive a scheduling indication message sent by the base station, where the scheduling indication message includes a transmission channel identifier of the service data and a cell identifier of an unlicensed cell that occupies N first spectrums, the transmission channel identifier is used to indicate a transmission channel on which the service data is transmitted, the N first spectrums are any N first spectrums in the M first spectrums, N is a positive integer, and 1≤N≤M; and receive, according to the service migration message, a subframe that is sent by the base station by using the N first spectrums; and obtain, according to the scheduling indication message, the service data carried in the subframe on the N first spectrums.

With reference to any one of the sixth aspect, or the first to the third possible implementation of the sixth aspect, in a fourth possible implementation, the processor executes the instruction to specifically:

receive configuration information of dedicated subframes and transmission channel information of the service data that are sent by the base station; and obtain, according to the service migration message, the configuration information of the dedicated subframes, and the transmission channel information of the service data, the service data carried in the dedicated subframes on the at least one first spectrum.

With reference to any one of the sixth aspect, or the first to the fourth possible implementation of the sixth aspect, in a fifth possible implementation, if all the dedicated subframes carry the service data, the configuration information of the dedicated subframes includes a time period occupied by the dedicated subframes or a quantity of the dedicated subframes.

With reference to any one of the sixth aspect, or the first to the fifth possible implementation of the sixth aspect, in a sixth possible implementation, the configuration information of the dedicated subframes includes a bitmap, and the bitmap is used to indicate a dedicated subframe that carries the service data.

With reference to any one of the fourth to the sixth possible implementations of the sixth aspect, in a seventh possible implementation, the processor executes the instruction to further:

determine, according to indication information carried in a last subframe in the dedicated subframes, whether to perform blind detection on a subsequent subframe, where the blind detection is used to determine whether the subsequent subframe carries new service data.

With reference to any one of the fourth to the seventh possible implementations of the sixth aspect, in an eighth possible implementation, the first spectrum is an unlicensed spectrum, and the second spectrum is a licensed spectrum.

According to the foregoing solutions, a base station obtains use permission of at least one first spectrum; broadcasts a service migration message by using a second spectrum, where the service migration message is used to instruct a terminal to receive service data on the at least one first spectrum; and sends the service data to the terminal by using the at least one first spectrum. In this way, when sending service data to the terminal by using the second spectrum, the base station may also send service data to the terminal by using the at least one first spectrum, thereby improving spectrum utilization, accelerating a rate at which the terminal obtains service data, and improving user experience.

BRIEF DESCRIPTION OF DRAWINGS

To describe the technical solutions in embodiments of the present invention more clearly, the following briefly describes the accompanying drawings required for describing the embodiments. Apparently, the accompanying drawings in the following description show merely some embodiments of the present invention, and persons of ordinary skill in the art may still derive another drawing from these accompanying drawings without creative efforts.

FIG. 7 is another schematic diagram in which dedicated subframes are configured on an unlicensed spectrum according to an embodiment of the present invention;

FIG. 8 is a schematic flowchart of another service data transmission method according to an embodiment of the present invention;

DESCRIPTION OF EMBODIMENTS

The following clearly describes the technical solutions in the embodiments of the present invention with reference to accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
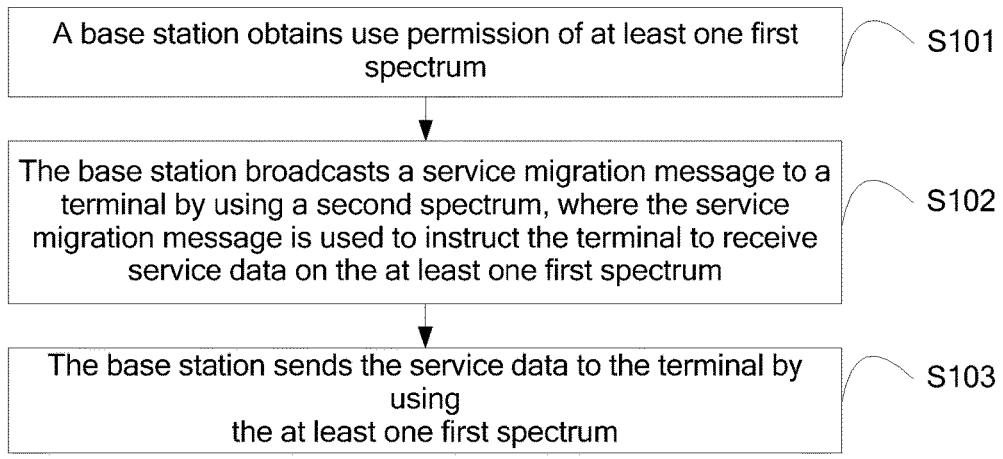
FIG. 1 is a schematic flowchart of a service data transmission method according to an embodiment of the present invention.

An embodiment of the present invention provides a service data transmission method. As shown in FIG. 1, the method includes the following steps:

S101. A base station obtains use permission of at least one first spectrum.

S102. The base station broadcasts a service migration message to a terminal by using a second spectrum, where the service migration message is used to instruct the terminal to receive service data on the at least one first spectrum.

S103. The base station sends the service data to the terminal by using the at least one first spectrum.

Optionally, both the first spectrum and the second spectrum are licensed spectrums. In this way, when a resource of the second spectrum is relatively poor, for example, radio signal strength is relatively weak, and network uplink and downlink rates are relatively low, the base station may migrate, to the first spectrum with a relatively good resource for transmission, service data that is transmitted on the second spectrum, thereby improving spectrum utilization, accelerating a service data transmission rate, and improving user experience.

Figure 2:
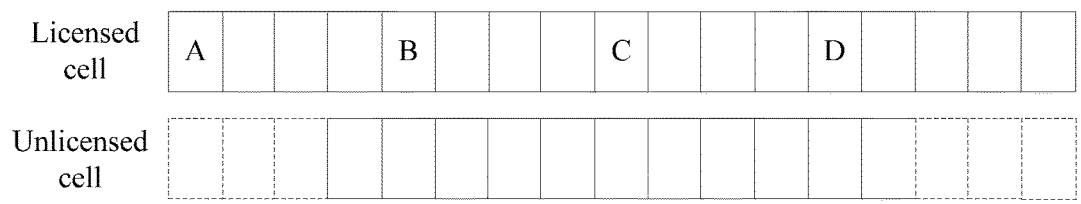
FIG. 2 is a schematic diagram of subframe transmission in a licensed cell and in an unlicensed cell according to an embodiment of the present invention.

Optionally, the first spectrum is an unlicensed spectrum, and the second spectrum is a licensed spectrum. It should be noted that, as an amount of mobile communications service data drastically increases, a wireless communications spectrum is increasingly insufficient. In recent years, some spectrums are vacated because a service such as a wireless television gradually withdraws from the market, but the Institute of Electrical and Electronics Engineers (IEEE) does not authorize the 3rd Generation Partnership Project (3GPP) to use these spectrum resources. Therefore, the vacated spectrums are unlicensed (unlicense) spectrums for the 3GPP. As shown in FIG. 2, a spectrum that the IEEE authorizes the 3GPP to use is referred to as a licensed spectrum, and a cell that occupies the licensed spectrum is referred to as a licensed cell. A spectrum that the IEEE does not authorize the 3GPP to use is referred to as an unlicensed spectrum, such as an idle television spectrum, and a cell that occupies the unlicensed spectrum is referred to as an unlicensed cell. Each block in FIG. 1 represents a subframe, and a direction indicated by an arrow is a subframe transmission direction in terms of time. That is, the terminal first receives a subframe A, and then receives a subframe B.

It should be noted that in the prior art, if the unlicensed spectrum is used as a dedicated carrier to send multimedia broadcast multicast service (MBMS) data, continuous transmission of the MBMS data cannot be ensured because continuous validation of the unlicensed spectrum cannot be ensured. In addition, when the dedicated carrier sends the MBMS data, the dedicated carrier is required to periodically send an MBMS control message. Because the unlicensed spectrum is not continuously valid, that the MBMS control message is periodically sent cannot be ensured. If the terminal does not correctly receive the MBMS control message, the terminal cannot correctly receive the MBMS data.

Specifically, the base station is configured to transmit the MBMS data in the unlicensed cell by using a multimedia broadcast multicast service single frequency network (MBSFN). The service migration message sent by the base station in the licensed cell includes control information transmitted by using the MBSFN. The control information includes a system information block (SIB) 13, a multicast control channel (MCCH), and MCCH change notification. The SIB 13 indicates a subframe location of the MCCH, a period of sending an MCCH message, and a used modulation and coding scheme. The MCCH is used to indicate a mapping relationship from the MBMS data to an MBMS transmission channel, a bitmap of a subframe occupied by each MBMS transmission channel, a scheduling start location, a period, and a used modulation and coding scheme. The MCCH change notification is used to indicate that content in the MCCH changes, so as to instruct an interested terminal to read new content in the MCCH in a timely manner. Because the control information is sent in the licensed cell, and the control information indicates control information that is transmitted in the unlicensed cell by using the MBSFN, the control information transmitted by using the MBSFN further includes indication information of a cell to which the control information belongs.

The base station determines, according to whether the base station obtains use permission of the unlicensed spectrum, a cell in which the MBMS data is sent. If the base station obtains the use permission of the unlicensed spectrum, the base station sends the MBMS data by using the unlicensed cell. If the base station does not obtain the use permission of the unlicensed spectrum, the base station sends the MBMS data by using the licensed spectrum. The base station may send the MBMS data in the licensed cell in a group scheduling manner. The licensed cell indicates a mapping relationship from an MBMS service to a group radio network temporary identifier (Group-RNTI). Cyclic redundancy check (CRC) code scrambling is performed on group scheduling signaling of the MBMS data by using a corresponding Group-RNTI. It should be noted that, after obtaining the use permission of the unlicensed spectrum, the base station needs to instruct the terminal to return to the unlicensed spectrum to receive the MBMS data. However, because a time of obtaining the use permission of the unlicensed spectrum is unpredictable, and the notification needs time, the base station may transmit the MBMS data in the unlicensed cell after several subframes. Correspondingly, before losing the use permission of the unlicensed spectrum (the base station may know in advance a time of losing the use permission), the base station needs to instruct the terminal to switch to the licensed cell in a timely manner to receive the MBMS data.

In addition, the service data transmitted by the base station to the terminal may be unicast service data or MBMS data. If the base station can use the unlicensed spectrum, the base station may transmit the MBMS data on the unlicensed spectrum in a mixed carrier manner, that is, a part of subframes in the unlicensed cell are used to transmit the MBMS data, and the other part of the subframes are not used to transmit the MBMS data; or the base station may transmit the MBMS data on the unlicensed spectrum in a dedicated carrier manner; or the base station may transmit the MBMS data in congestion in a WiFi broadcasting manner in an LTE-WiFi multiflow transmission case. In all the embodiments of the present invention, the base station may perform MBSFN transmission or perform single-cell transmission of group scheduling on a carrier.

The following specifically describes a method for sending service data to a terminal by a base station when a first spectrum is an unlicensed spectrum and a second spectrum is a licensed spectrum.

As shown in FIG. 2, the base station may obtain use permission of the unlicensed spectrum. Solid line boxes in the unlicensed cell shown in FIG. 2 represent subframes in a time period during which the base station can use the unlicensed spectrum, and dotted line boxes shown in FIG. 2 are subframes beyond the time period during which the base station can use the unlicensed spectrum. Four subframes A, B, C, and D are subframes used to send MBMS data. A subframe that is used to send MBMS data is referred to as an MBSFN subframe, and another non-MBSFN subframe may be used to send unicast service data.

It should be noted that FIG. 2 shows a scenario in which the base station obtains use permission of one unlicensed spectrum. In this embodiment of the present invention, the base station may simultaneously obtain use permission of multiple unlicensed spectrums, and transmit, within an available time of each unlicensed spectrum, service data by using a subframe on each unlicensed spectrum.

Figure 3:
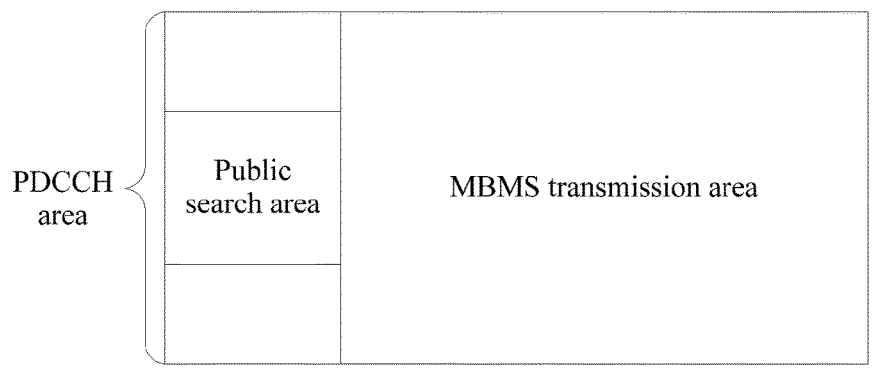
FIG. 3 is a schematic structural diagram of an MBSFN subframe according to an embodiment of the present invention.

FIG. 3 is a schematic structural diagram of an MBSFN subframe. The MBSFN subframe includes a physical downlink control channel (PDCCH) area and an MBMS transmission area. A public search area of the PDCCH area may carry downlink control information (DCI). When monitoring the subframe, the terminal may perform blind detection on the public search area of the PDCCH area, to determine whether the subframe carries MBMS data. The MBMS transmission area carries a Media Access Control control element (MAC CE) and MBMS data.

Further, the base station sends the service migration message by using a specific subframe on the licensed spectrum. The specific subframe is a subframe transmitted on the licensed spectrum before the base station sends the service data by using the at least one unlicensed spectrum.

For example, after obtaining the use permission of the unlicensed spectrum, the base station adds the service migration message to a first MBSFN subframe on the licensed spectrum. FIG. 2 is used as an example for illustration. If a subframe B is the first MBSFN subframe on the licensed spectrum after the base station obtains the use permission of the unlicensed spectrum, the base station may add the service migration message to the subframe B.

The foregoing is merely an example used for illustration. In this embodiment of the present invention, the service migration message may be sent by using a non-MBSFN subframe. This is not limited in the present invention.

Specifically, as shown in FIG. 3, the base station may broadcast the service migration message to the terminal in the MBSFN subframe in a form of DCI or in a form of a MAC CE. The DCI is placed in the public search area of the MBSFN subframe, and the MAC CE is placed in the MBMS transmission area of the MBSFN subframe. Alternatively, the base station may add the service migration message to radio resource control (RRC) signaling. This is not limited in the present invention.

In addition, in a possible implementation of this embodiment of the present invention, after the base station obtains the use permission of the unlicensed spectrum, it does not indicate that the base station must migrate service data to the unlicensed spectrum. A user may preset a migration condition. For example, when congestion occurs during service data transmission on the licensed spectrum, the base station may migrate a part of the service data to the unlicensed spectrum for sending. In this case, before broadcasting the service migration message by using the licensed spectrum, the base station may determine that congestion occurs during service data transmission on the licensed spectrum.

Further, the base station may send service data to the terminal by using an unlicensed spectrum in the following two manners.

Manner 1: The base station sends the service data to the terminal in a subframe scheduling manner by using at least one unlicensed spectrum.

In Manner 1, the service migration message may include frequency information of the at least one unlicensed spectrum, a cell identifier of an unlicensed cell that occupies the at least one unlicensed spectrum, and a service identifier of the service data.

If the base station obtains use permission of M unlicensed spectrums, and M is a positive integer greater than or equal to 1, the base station sends, to the terminal, a scheduling indication message corresponding to the service data, where the scheduling indication message includes a transmission channel identifier of the service data, and the transmission channel identifier is used to indicate a transmission channel on which the service data is transmitted; and sends the service data by using a subframe on the M unlicensed spectrums.

In this way, after receiving the service migration message, the terminal listens to the unlicensed cell corresponding to the unlicensed cell identifier, and performs blind detection on a subframe on the unlicensed spectrum according to the frequency information. The blind detection performed on the subframe by the terminal is used to determine whether the subframe carries service data.

Further, after detecting, by means of blind detection, that the subframe carries service data, the terminal obtains transmission channel information on the corresponding transmission channel according to the transmission channel identifier. The transmission channel information is used to indicate a physical resource location occupied by the service data carried in the subframe, and a modulation and demodulation scheme of the service data. In this way, the terminal further decodes the data at the physical resource location according to the modulation and demodulation scheme, and obtains, from decoded data according to the service identifier, the service data required by the terminal.

It should be noted that a service identifier is in a one-to-one correspondence with a service delivered by the base station. Because the base station may simultaneously transmit multiple pieces of service data, the terminal may obtain, from the multiple pieces of service data according to the service identifier, the service data required by the terminal.

Figure 4:
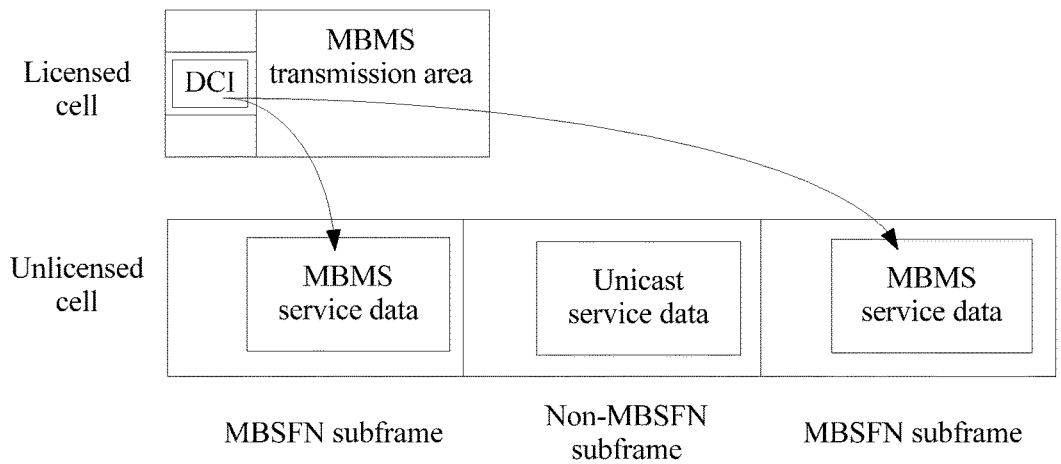
FIG. 4 is a schematic diagram in which service data carried in multiple subframes on an unlicensed spectrum is indicated by using a piece of DCI according to an embodiment of the present invention.

In addition, the base station may send the scheduling indication message by using a subframe on a licensed spectrum or a subframe on the unlicensed spectrum. The scheduling indication message may be used to indicate a physical resource location occupied by service data carried in multiple subframes on an unlicensed spectrum, and a modulation and demodulation scheme of the service data. The multiple subframes may be continuous or may be discontinuous. FIG. 4 is used as an example for illustration. A scheduling indication message (that is, the DCI) carried in a subframe on a licensed spectrum instructs the terminal to obtain service data in two discontinuous MBSFN subframes on an unlicensed spectrum.

It should be noted that when obtaining use permission of multiple unlicensed spectrums, the base station may not use all the unlicensed spectrums to send service data each time. Specifically, when the base station obtains use permission of M unlicensed spectrums, and M is a positive integer greater than 1, the base station may send, to the terminal, a scheduling indication message corresponding to the service data. The scheduling indication message includes a transmission channel identifier of the service data and a cell identifier of an unlicensed cell that occupies N unlicensed spectrums. The transmission channel identifier is used to indicate a transmission channel on which the service data is transmitted. The N unlicensed spectrums are any N unlicensed spectrums in the M unlicensed spectrums, N is a positive integer, and 1≤N≤M. The base station sends the service data by using a subframe on the N unlicensed spectrums.

That is, the cell identifier of the unlicensed cell in the service migration message may refer to a cell identifier of an unlicensed cell in which the base station may transmit service data. For example, if the base station obtains use permission of a first unlicensed spectrum and use permission of a second unlicensed spectrum, the cell identifier carried in the service migration message is a cell identifier of an unlicensed cell that occupies the first unlicensed spectrum and a cell identifier of an unlicensed cell that occupies the second unlicensed spectrum. However, the cell identifier in the scheduling indication message may be a cell identifier of an unlicensed cell in which service data is currently sent, and the cell identifier in the scheduling indication message may be a cell identifier of an unlicensed cell that occupies the first unlicensed spectrum and/or a cell identifier of an unlicensed cell that occupies the second unlicensed spectrum.

In this way, after obtaining the use permission of the multiple unlicensed spectrums, the base station may select, from the multiple unlicensed spectrums, one or more unlicensed spectrums to send service data. In this case, the base station may send a scheduling indication message on an unlicensed spectrum or on a licensed spectrum by using one piece of DCI or multiple pieces of DCI. It should be noted that when the base station uses one piece of DCI to indicate service data carried in multiple subframes, multiple pieces of service data of different unlicensed cells must occupy a same physical resource location in subframes corresponding to the multiple pieces of service data.

Figure 5:
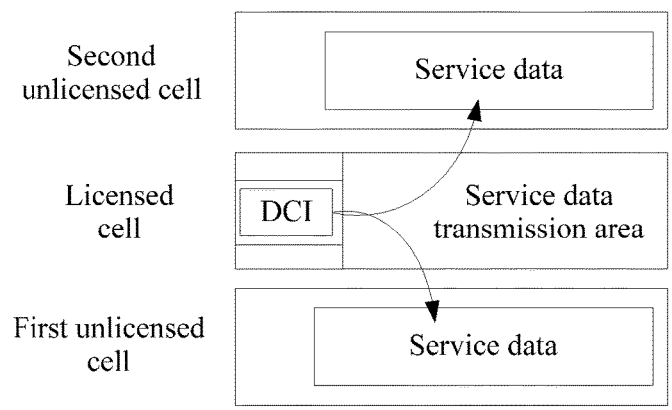
FIG. 5 is a schematic diagram in which service data carried in subframes on two unlicensed spectrums is indicated by using a piece of DCI according to an embodiment of the present invention.

FIG. 5 is used as an example for illustration. The base station separately obtains use permission of an unlicensed spectrum of a first unlicensed cell and use permission of an unlicensed spectrum of a second unlicensed cell. The first unlicensed cell occupies a first unlicensed spectrum, and the second unlicensed cell occupies a second unlicensed spectrum. In this case, the service migration message includes a cell identifier of the first unlicensed cell, a cell identifier of the second unlicensed cell, frequency information of the first unlicensed spectrum, frequency information of the second unlicensed spectrum, a service identifier of service data transmitted in the first unlicensed cell, and a service identifier of service data transmitted in the second licensed cell. The scheduling indication message includes the cell identifier of the first unlicensed cell, the cell identifier of the second unlicensed cell, a transmission channel identifier of a service transmitted in the first licensed cell, and a transmission channel identifier of a service transmitted in the second licensed cell.

In this embodiment of the present invention, service data may also be retransmitted in Manner 1. Specifically, when the terminal does not receive or does not correctly receive service data in an unlicensed cell, the terminal may send a retransmission indication message to a licensed cell or the unlicensed cell. The retransmission indication message may include a serial number of a service data packet that is not received by the terminal, or a subframe number of service data that is not correctly received by the terminal. In this way, after receiving the retransmission indication message, the base station determines, according to the serial number or the subframe number, service data that needs to be retransmitted, and retransmits the service data to the terminal by using the licensed cell or the unlicensed cell. In this case, the scheduling indication message may further include a retransmission identifier, so that the terminal can distinguish retransmitted service data.

The base station may also retransmit the service data by using another cell other than the unlicensed cell. The another cell may be a licensed cell, or may be another unlicensed cell. The base station retransmits the service data by using the another cell, so that a problem that the terminal cannot receive data due to a "hidden node" can be resolved. For example, a terminal is simultaneously located in a first cell and a second cell, and a base station of the first cell and a base station of the second cell cannot detect existence of each other because a relatively far distance exists between the base station of the first cell and the base station of the second cell. In this case, the base station of the first cell and the base station of the second cell are hidden nodes to each other. In this way, if the first cell and the second cell simultaneously send service data to the terminal, a data conflict is caused, so that the terminal cannot receive the data. Because a time interval at which the first cell performs retransmission is the same as a time interval at which the second cell performs retransmission, if the base station of the first cell and the base station of the second cell perform retransmission by using a same cell, the terminal still cannot receive the retransmitted service data due to a data conflict. In this case, the base station may perform retransmission by using another cell, so as to resolve a hidden node problem.

According to the foregoing method for retransmitting service data by using an unlicensed cell, a packet loss rate of the terminal is reduced.

Manner 2: The base station sends configuration information of dedicated subframes on at least one unlicensed spectrum and transmission channel information of the service data to the terminal, and the base station sends the service data to the terminal by using the dedicated subframes.

The dedicated subframe may be a subframe that is specifically used to carry service data. For example, several continuous subframes within a time period may be regarded as dedicated subframes, or a subframe that is used to transmit service data and is indicated by configuration information may also be regarded as a dedicated subframe.

Optionally, the base station may send the configuration information of the dedicated subframes and the transmission channel information of the service data to the terminal by using the service migration message. That is, in Manner 2, the service migration message includes frequency information of the at least one unlicensed spectrum, a cell identifier of an unlicensed cell that occupies the at least one unlicensed spectrum, a service identifier of the service data, the configuration information of the dedicated subframes, and the transmission channel information of the service data.

The foregoing is merely a possible implementation of this embodiment of the present invention. After broadcasting the service migration message, the base station may also send the configuration information of the dedicated subframes and the transmission channel information of the service data to the terminal by using a subframe on a licensed spectrum or a subframe on an unlicensed spectrum. This is not limited in the present invention.

Optionally, if all the dedicated subframes carry the service data, the configuration information of the dedicated subframes may be a time period occupied by the dedicated subframes or a quantity of the dedicated subframes.

It should be noted that the base station may pre-agree with the terminal about a start location of the dedicated subframes. For example, the base station may send the configuration information and the transmission channel information of the service data by using a subframe before the dedicated subframes. After obtaining the configuration information and the transmission channel information of the service data in the subframe, the terminal directly starts to receive, from a next subframe, the dedicated subframes that occupy the corresponding time period or the corresponding quantity of the dedicated subframes, and obtains, according to the transmission channel information and the service identifier in the service migration message, the service data carried in the dedicated subframes. Alternatively, the base station may notify the terminal of a start location of the dedicated subframes each time. In this case, the configuration information further includes start location information of the dedicated subframes.

Figure 6:
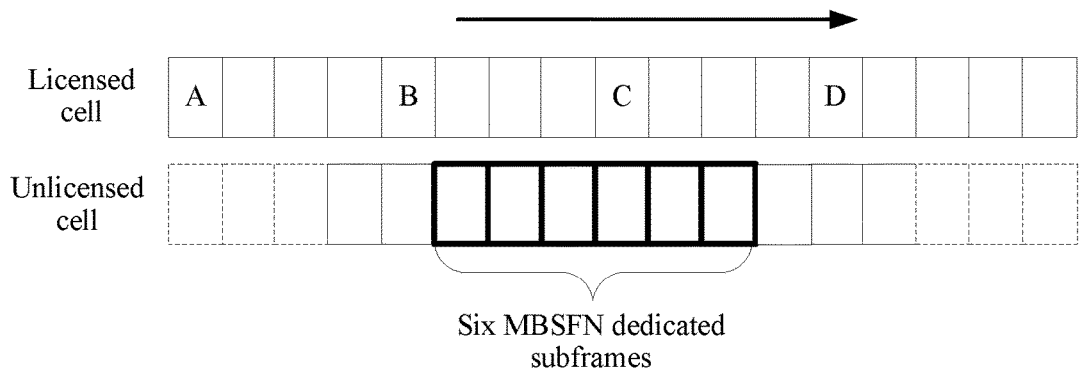
FIG. 6 is a schematic diagram in which dedicated subframes are configured on an unlicensed spectrum according to an embodiment of the present invention.

For example, as shown in FIG. 6, thick line blocks in the figure are dedicated subframes on an unlicensed spectrum, and a direction indicated by an arrow is a subframe transmission direction in terms of time. The base station sends, by using an MBSFN subframe B, configuration information of the dedicated subframes and transmission channel information of service data carried in the dedicated subframes. The configuration information of the dedicated subframes includes a time period occupied by the dedicated subframes or a quantity of the dedicated subframes, and the configuration information further includes start location information of the dedicated subframes. As shown in FIG. 6, the start location information indicates that a subframe that is on the unlicensed spectrum and that is following the MBSFN subframe B is a first dedicated subframe. In this way, after receiving the configuration information and the transmission channel information, the terminal continuously receives, on the unlicensed spectrum according to the start location information, the dedicated subframes that occupy the corresponding time period. Alternatively, the base station counts received subframes, continuously receives six dedicated subframes, and obtains, according to the transmission channel information and the service identifier in the service migration message, the service data carried in the dedicated subframes. Therefore, the terminal does not need to perform blind detection on the dedicated subframes.

Optionally, the configuration information of the dedicated subframes includes a bitmap, and the bitmap is used to indicate a dedicated subframe that carries the service data.

For example, the preset bitmap includes six bits: 101001. Each bit is corresponding to a subframe. If a value of the bit is 0, it indicates that a subframe corresponding to the bit is an MBSFN dedicated subframe. If a value of the bit is 1, it indicates that a subframe corresponding to the bit is a non-MBSFN dedicated subframe. As shown in FIG. 7, a direction indicated by an arrow is a subframe transmission direction in terms of time. The base station may pre-agree with the terminal that a subframe that is on an unlicensed spectrum and that is following an MBSFN subframe B is a subframe corresponding to a first bit in the bitmap, and subsequent bits are sequentially corresponding to subsequent subframes. If the MBSFN subframe B carries a service migration message, and the service migration message includes the bitmap, after receiving the service migration message, the terminal directly discards non-MBSFN dedicated subframes according to the bitmap, and obtains, according to transmission channel information and a service identifier, MBMS data carried in MBMSFN dedicated subframes. Therefore, the terminal does not need to perform blind detection on subframes corresponding to the bitmap.

The foregoing is merely an example used for illustration. The base station may also pre-agree with the terminal that when a value of a bit is 1, it indicates that a subframe corresponding to the bit is an MBSFN dedicated subframe, and when a value of a bit is 0, it indicates that a subframe corresponding to the bit is a non-MBSFN dedicated subframe. This is not limited in the present invention.

Optionally, the base station adds indication information to a last subframe in the dedicated subframes. The indication message is used by the terminal to determine whether to perform blind detection on a subsequent subframe. The blind detection is used to determine whether the subsequent subframe carries new service data.

Specifically, if the indication information indicates that the base station cannot possibly send service data by using the at least one unlicensed spectrum, the terminal may not need to perform blind detection on a subframe on the at least one unlicensed spectrum. If the indication information indicates that the base station can possibly send service data by using the at least one unlicensed spectrum, the terminal may perform blind detection on a subframe on the at least one unlicensed spectrum. In this way, the base station does not need to accurately determine in advance a quantity of dedicated subframes. For a service whose data amount greatly fluctuates, such as a group service, the base station may set an approximate quantity of dedicated subframes. When the dedicated subframes cannot carry all data because an amount of the to-be-transmitted data is relatively large, the base station may send exceeded data by using a subsequent subframe, and add indication information to a last subframe in the dedicated subframes, to instruct the terminal to perform blind detection on the subsequent subframe, thereby avoiding subframe waste that is caused by excessive dedicated subframes when a relatively small amount of data is transmitted.

It should be noted that in the foregoing Manner 1, a subframe that is on an unlicensed spectrum and is used to transmit service data can be dynamically determined. In this case, the terminal may perform blind detection on a subframe on an unlicensed spectrum to determine whether the subframe carries service data. However, in Manner 2, the base station pre-configures dedicated subframes on an unlicensed spectrum to transmit service data, and sends configuration information of the dedicated subframes to the terminal. In this way, the terminal does not need to perform blind detection on the dedicated subframes, but directly obtains service data from the dedicated subframes according to transmission channel information. In addition, for a non-dedicated subframe in Manner 2, the base station may dynamically determine, according to the method in Manner 1, which subframe is used to transmit service data. Therefore, an implementation is more flexible.

Further, when the use permission of the at least one unlicensed spectrum ends, the base station broadcasts a service backward migration message by using the licensed spectrum or the at least one unlicensed spectrum. The service backward migration message is used to instruct the terminal to receive service data on the licensed spectrum again.

In this way, the base station may transmit service data by using an unlicensed spectrum, thereby improving unlicensed spectrum utilization, reducing a burden of transmitting service data on a licensed spectrum that is occupied by a primary cell, and improving user experience.

In addition, the foregoing is merely described for a case in which a first spectrum is an unlicensed spectrum and a second spectrum is a licensed spectrum. However, persons skilled in the art should understand that this embodiment of the present invention is also applicable to a case in which both a first spectrum and a second spectrum are licensed spectrums.

An embodiment of the present invention provides another service data transmission method. As shown in FIG. 8, the method includes the following steps:

S801. A terminal receives a service migration message that is broadcast by a base station by using a second spectrum, where the service migration message is used to instruct the terminal to receive service data on at least one first spectrum.

S802. The terminal receives, according to the service migration message, the service data that is sent by the base station by using the at least one first spectrum.

Optionally, both the first spectrum and the second spectrum are licensed spectrums. In this way, when a resource of the second spectrum is relatively poor, for example, radio signal strength is relatively weak, and network uplink and downlink rates are relatively low, the base station may migrate, to the first spectrum with a relatively good resource for transmission, service data that is transmitted on the second spectrum, thereby improving spectrum utilization, accelerating a service data transmission rate, and improving user experience.

The following specifically describes a method in which the terminal receives, when the first spectrum is an unlicensed spectrum and the second spectrum is a licensed spectrum, service data sent by the base station.

For details, refer to corresponding description in the foregoing method embodiment. After obtaining use permission of at least one unlicensed spectrum, the base station sends a service migration message to the terminal by using a licensed spectrum. The service migration message may include frequency information of the at least one unlicensed spectrum, a cell identifier of an unlicensed cell that occupies the at least one unlicensed spectrum, and a service identifier of the service data.

In this way, after receiving the service migration message, the terminal listens to the unlicensed cell corresponding to the unlicensed cell identifier, and performs blind detection on a subframe on the unlicensed spectrum according to the frequency information. The blind detection performed on the subframe by the terminal is used to determine whether the subframe carries service data.

Further, the terminal obtains the service data on the at least one unlicensed spectrum according to the service migration message in the following two manners:

Manner 1: The terminal receives the service data that is sent by the base station in a scheduling manner by using the at least one unlicensed spectrum.

Specifically, if the base station obtains use permission of M unlicensed spectrums, and M is a positive integer greater than or equal to 1, the terminal receives a scheduling indication message sent by the base station, where the scheduling indication message includes a transmission channel identifier of the service data; receives, according to the service migration message, a subframe that is sent by the base station by using the M unlicensed spectrums; and obtains, according to the scheduling indication message, the service data carried in the subframe.

Specifically, after receiving the service migration message, the terminal listens to the unlicensed cell corresponding to the unlicensed cell identifier, and performs blind detection on a subframe on the unlicensed spectrum according to the frequency information. After detecting, by means of blind detection, that the subframe carries service data, the terminal obtains transmission channel information on the corresponding transmission channel according to the transmission channel identifier. The transmission channel information is used to indicate a physical resource location occupied by the service data carried in the subframe, and a modulation and demodulation scheme of the service data. In this way, the terminal further decodes the data at the physical resource location according to the modulation and demodulation scheme, and obtains, from decoded data according to the service identifier, the service data required by the terminal.

When obtaining use permission of multiple unlicensed spectrums, the base station may not use all the unlicensed spectrums to send service data each time. Specifically, when the base station obtains use permission of M unlicensed spectrums, and M is a positive integer greater than 1, the terminal may receive a scheduling indication message sent by the base station, where the scheduling indication message includes a transmission channel identifier of the service data and a cell identifier of an unlicensed cell that occupies N unlicensed spectrums, the transmission channel identifier is used to indicate a transmission channel on which the service data is transmitted, the N unlicensed spectrums are any N unlicensed spectrums in the M unlicensed spectrums, N is a positive integer, and $1 \leq N \leq M$; receive, according to the service migration message, a subframe that is sent by the base station by using the N unlicensed spectrums; and obtain, according to the scheduling indication message, the service data carried in the subframe on the N unlicensed spectrums.

That is, the cell identifier of the unlicensed cell in the service migration message may refer to a cell identifier of an unlicensed cell in which the base station may transmit service data. For example, if the base station obtains use permission of a first unlicensed spectrum and use permission of a second unlicensed spectrum, the cell identifier carried in the service migration message is a cell identifier of an unlicensed cell that occupies the first unlicensed spectrum and a cell identifier of an unlicensed cell that occupies the second unlicensed spectrum. However, the cell identifier in the scheduling indication message may be a cell identifier of an unlicensed cell in which service data is currently sent, and the cell identifier in the scheduling indication message may be a cell identifier of an unlicensed cell that occupies the first unlicensed spectrum and/or a cell identifier of an unlicensed cell that occupies the second unlicensed spectrum.

In this way, after obtaining the use permission of the multiple unlicensed spectrums, the base station may select, from the multiple unlicensed spectrums, one or more unlicensed spectrums to send service data. In this case, the base station may send a scheduling indication message on an unlicensed spectrum or on a licensed spectrum by using one piece of DCI or multiple pieces of DCI. It should be noted that when the base station uses one piece of DCI to indicate service data carried in multiple subframes, multiple pieces of service data of different unlicensed cells must occupy a same physical resource location in subframes corresponding to the multiple pieces of service data.

Optionally, in Manner 1, when the terminal does not receive or does not correctly receive service data in an unlicensed cell, the terminal may send a retransmission indication message to a licensed cell or the unlicensed cell. The retransmission indication message may include a serial number of a service data packet that is not received by the terminal, or a subframe number of service data that is not correctly received by the terminal. In this way, after receiving the retransmission indication message, the base station determines, according to the serial number or the subframe number, service data that needs to be retransmitted, and retransmits the service data to the terminal by using the licensed cell or the unlicensed cell. In this case, the scheduling indication message may further include a retransmission identifier, so that the terminal can distinguish retransmitted service data.

The base station may also retransmit the service data by using another cell other than the unlicensed cell. The another cell may be a licensed cell, or may be another unlicensed cell. The base station retransmits the service data by using the another cell, so that a problem that the terminal cannot receive data due to a "hidden node" can be resolved. For example, a terminal is simultaneously located in a first cell and a second cell, and a base station of the first cell and a base station of the second cell cannot detect existence of each other because a relatively far distance exists between the base station of the first cell and the base station of the second cell. In this case, the base station of the first cell and the base station of the second cell are hidden nodes to each other. In this way, if the first cell and the second cell simultaneously send service data to the terminal, a data conflict is caused, so that the terminal cannot receive the data. Because a time interval at which the first cell performs retransmission is the same as a time interval at which the second cell performs retransmission, if the base station of the first cell and the base station of the second cell perform retransmission by using a same cell, the terminal still cannot receive the retransmitted service data due to a data conflict. In this case, the base station may perform retransmission by using another cell, so as to resolve a hidden node problem.

According to the foregoing method for retransmitting service data by using an unlicensed cell, a packet loss rate of the terminal is reduced.

Manner 2: The terminal receives configuration information of dedicated subframes and transmission channel information of the service data that are sent by the base station, and obtains, according to the service migration message, the configuration information of the dedicated subframes, and the transmission channel information of the service data, the service data carried in the dedicated subframes on the at least one unlicensed spectrum.

The dedicated subframe may be a subframe that is specifically used to carry service data. For example, several continuous subframes within a time period may be regarded as dedicated subframes, or a subframe that is used to transmit service data and is indicated by configuration information may also be regarded as a dedicated subframe.

Optionally, the base station may send the configuration information of the dedicated subframes and the transmission channel information of the service data to the terminal by using the service migration message. That is, in Manner 2, the service migration message includes frequency information of the at least one unlicensed spectrum, a cell identifier of an unlicensed cell that occupies the at least one unlicensed spectrum, a service identifier of the service data, the configuration information of the dedicated subframes, and the transmission channel information of the service data.

The foregoing is merely a possible implementation of this embodiment of the present invention. After broadcasting the service migration message, the base station may also send the configuration information of the dedicated subframes and the transmission channel information of the service data to the terminal by using a subframe on a licensed spectrum or a subframe on an unlicensed spectrum. This is not limited in the present invention.

Optionally, if all the dedicated subframes carry the service data, the configuration information of the dedicated subframes may be a time period occupied by the dedicated subframes or a quantity of the dedicated subframes.

It should be noted that the base station may pre-agree with the terminal about a start location of the dedicated subframes. For example, the base station may send the configuration information and the transmission channel information of the service data by using a subframe before the dedicated subframes. After obtaining the configuration information and the transmission channel information of the service data in the subframe, the terminal directly starts to receive, from a next subframe, the dedicated subframes that occupy the corresponding time period or the corresponding quantity of the dedicated subframes, and obtains, according to the transmission channel information and the service identifier in the service migration message, the service data carried in the dedicated subframes. Alternatively, the base station may notify the terminal of a start location of the dedicated subframes each time. In this case, the configuration information further includes start location information of the dedicated subframes.

For example, as shown in FIG. 6, thick line blocks in the figure are dedicated subframes on an unlicensed spectrum, and a direction indicated by an arrow is a subframe transmission direction in terms of time. The base station sends, by using an MBSFN subframe B, configuration information of the dedicated subframes and transmission channel information of service data carried in the dedicated subframes. The configuration information of the dedicated subframes includes a time period occupied by the dedicated subframes or a quantity of the dedicated subframes, and the configuration information further includes start location information of the dedicated subframes. As shown in FIG. 6, the start location information indicates that a subframe that is on the unlicensed spectrum and that is following the MBSFN subframe B is a first dedicated subframe. In this way, after receiving the configuration information and the transmission channel information, the terminal continuously receives, on the unlicensed spectrum according to the start location information, the dedicated subframes that occupy the corresponding time period. Alternatively, the base station counts received subframes, continuously receives six dedicated subframes, and obtains, according to the transmission channel information and the service identifier in the service migration message, the service data carried in the dedicated subframes. Therefore, the terminal does not need to perform blind detection on the dedicated subframes.

Optionally, the configuration information of the dedicated subframes includes a bitmap that is used to indicate a subframe that carries the service data within the dedicated subframe.

For example, the preset bitmap includes six bits: 101001. Each bit is corresponding to a subframe. If a value of the bit is 0, it indicates that a subframe corresponding to the bit is an MBSFN dedicated subframe. If a value of the bit is 1, it indicates that a subframe corresponding to the bit is a non-MBSFN dedicated subframe. As shown in FIG. 7, a direction indicated by an arrow is a subframe transmission direction in terms of time. The base station may pre-agree with the terminal that a subframe that is on an unlicensed spectrum and that is following an MBSFN subframe B is a subframe corresponding to a first bit in the bitmap, and subsequent bits are sequentially corresponding to subsequent subframes. If the MBSFN subframe B carries a service migration message, and the service migration message includes the bitmap, after receiving the service migration message, the terminal directly discards non-MBSFN dedicated subframes according to the bitmap, and obtains, according to transmission channel information and a service identifier, MBMS data carried in MBMSFN dedicated subframes. Therefore, the terminal does not need to perform blind detection on subframes corresponding to the bitmap. Optionally, the base station adds indication information to a last subframe in the dedicated subframes. The indication message is used by the terminal to determine whether to perform blind detection on a subsequent subframe. The blind detection is used to determine whether the subsequent subframe carries new service data.

Specifically, if the indication information indicates that the base station cannot possibly send service data by using the at least one unlicensed spectrum, the terminal may not need to perform blind detection on a subframe on the at least one unlicensed spectrum. If the indication information indicates that the base station can possibly send service data by using the at least one unlicensed spectrum, the terminal may perform blind detection on a subframe on the at least one unlicensed spectrum. In this way, the base station does not need to accurately determine in advance a quantity of dedicated subframes. For a service whose data amount greatly fluctuates, such as a group Group service, the base station may set an approximate quantity of dedicated subframes. When the dedicated subframes cannot carry all data because an amount of the to-be-transmitted data is relatively large, the base station may send exceeded data by using a subsequent subframe, and add indication information to a last subframe in the dedicated subframes, to instruct the terminal to perform blind detection on the subsequent subframe, thereby avoiding subframe waste that is caused by excessive dedicated subframes when a relatively small amount of data is transmitted.

Further, the terminal receives a service backward migration message that is broadcast by the base station by using the licensed spectrum or the at least one unlicensed spectrum, and receives service data on the licensed spectrum according to the service backward migration message again.

It should be noted that the foregoing is merely described for a case in which a first spectrum is an unlicensed spectrum and a second spectrum is a licensed spectrum. However, persons skilled in the art should understand that this embodiment of the present invention is also applicable to a case in which both a first spectrum and a second spectrum are licensed spectrums.

Figure 9:
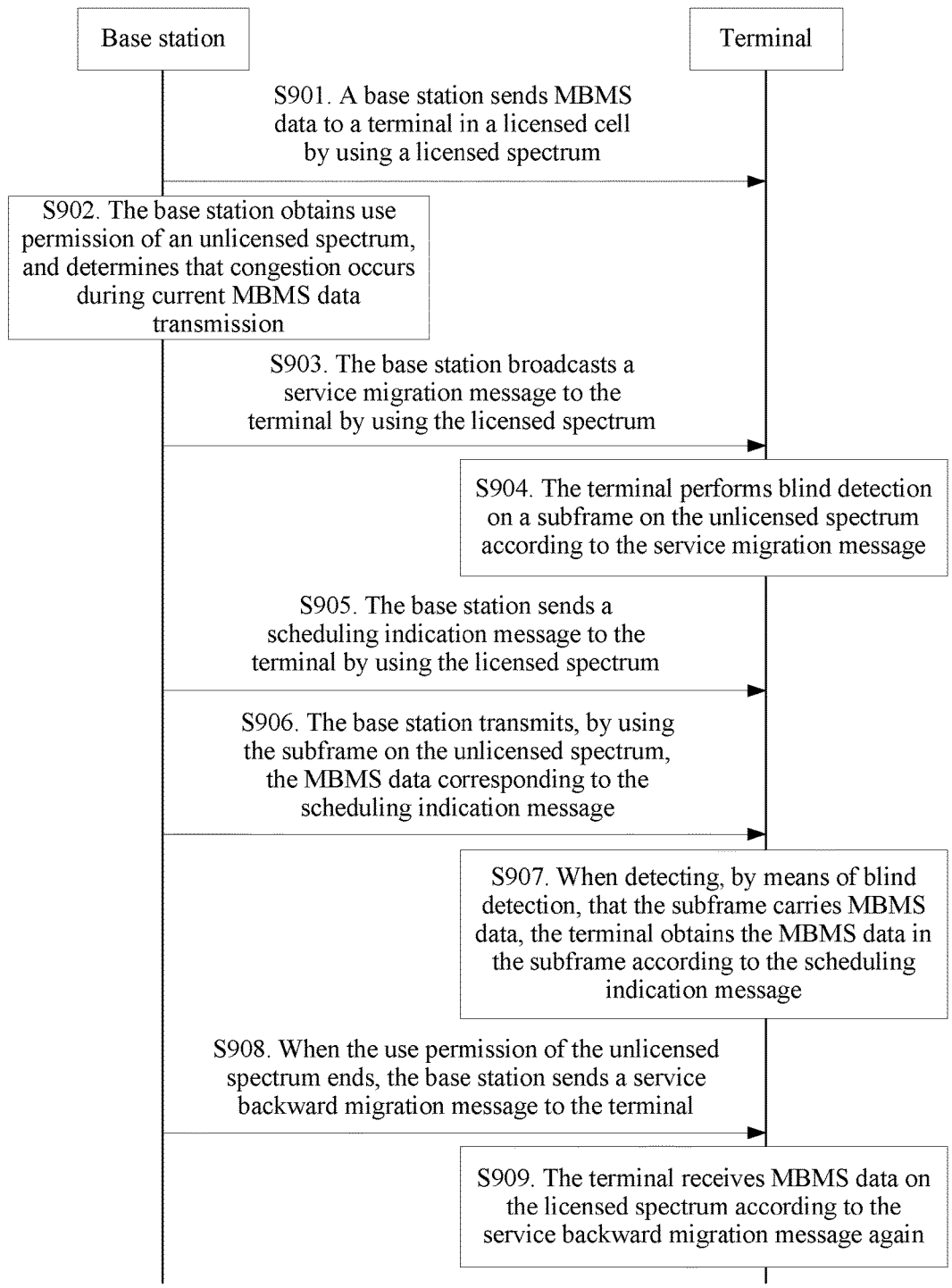
FIG. 9 is a schematic flowchart of still another service data transmission method according to an embodiment of the present invention.

To make persons skilled in the art more clearly understand a technical solution of a service data transmission method provide in an embodiment of the present invention, the following describes the technical solution in detail by using a specific embodiment. This embodiment of the present invention is described by using an example in which a base station obtains use permission of a single unlicensed spectrum, and transmits MBMS data in a subframe scheduling manner. As shown in FIG. 9, the technical solution includes the following steps:

S901. A base station sends MBMS data to a terminal in a licensed cell by using a licensed spectrum.

S902. The base station obtains use permission of an unlicensed spectrum, and determines that congestion occurs during current MBMS data transmission.

S903. The base station broadcasts a service migration message to the terminal by using the licensed spectrum.

The service migration message is used to instruct the terminal to receive service data on the unlicensed spectrum.

Specifically, as shown in FIG. 2, the base station may broadcast the service migration message to the terminal in an MBSFN subframe in a form of DCI or in a form of a MAC CE. The DCI is placed in a public search area of the MBSFN subframe, and the MAC CE is placed in an MBMS transmission area of the MBSFN subframe. Alternatively, the base station may add the service migration message to radio resource control RRC signaling. This is not limited in the present invention.

S904. The terminal performs blind detection on a subframe on the unlicensed spectrum according to the service migration message.

Specifically, the service migration message includes frequency information of the unlicensed spectrum, a cell identifier of an unlicensed cell that occupies the unlicensed spectrum, and a service identifier of the MBMS data. In this case, after receiving the service migration message, the terminal listens to the subframe on the unlicensed spectrum according to the cell identifier and the frequency information in the service migration message, and performs blind detection on a subframe detected by means of listening, to determine whether the subframe carries MBMS data.

S905. The base station sends a scheduling indication message to the terminal by using the licensed spectrum.

The scheduling indication message includes a transmission channel identifier, and the transmission channel identifier is used to indicate a transmission channel on which the MBMS data is transmitted.

It should be noted that the base station may also send the scheduling indication message by using the unlicensed spectrum.

S906. The base station transmits, by using the subframe on the unlicensed spectrum, the MBMS data corresponding to the scheduling indication message.

S907. When detecting, by means of blind detection, that the subframe carries MBMS data, the terminal obtains the MBMS data in the subframe according to the scheduling indication message.

Specifically, after detecting, by means of the blind detection, that the subframe carries MBMS data, the terminal obtains transmission channel information on the corresponding transmission channel according to the transmission channel identifier, and the transmission channel information is used to indicate a physical resource location occupied by the MBMS data carried in the subframe, and a modulation and demodulation scheme of the MBMS data. In this way, the terminal decodes the data at the physical resource location according to the modulation and demodulation scheme, and obtains, from decoded data according to the service identifier, the service data required by the terminal. A service identifier is in a one-to-one correspondence with a service delivered by the base station. Because the base station may simultaneously transmit multiple pieces of service data, the terminal needs to obtain, from the multiple pieces of service data according to the service identifier, the service data required by the terminal.

S908. When the use permission of the unlicensed spectrum ends, the base station broadcasts a service backward migration message to the terminal.

Specifically, the base station may broadcast the service backward migration message by using the licensed spectrum or the unlicensed spectrum.

S909. The terminal receives MBMS data on the licensed spectrum according to the service backward migration message again.

It should be noted that, to make description brief, the foregoing method embodiments are expressed as a series of actions. However, persons skilled in the art should appreciate that the present invention is not limited to the described action sequence. In addition, persons skilled in the art should also appreciate that all the embodiments described in the specification are preferred embodiments, and the related actions and modules are not necessarily mandatory to the present invention.

In this way, the base station may transmit service data by using an unlicensed spectrum, thereby improving unlicensed spectrum utilization.

With reference to Manner 2 in the method embodiments shown in FIG. 3 and FIG. 8, in this embodiment of the present invention, the transmission channel information and configuration information of dedicated subframes of the base station on at least one unlicensed spectrum may also be added to the service migration message. In this way, the terminal may determine, according to the configuration information, which subframe carries MBMS data, and directly obtain MBMS data in the dedicated subframes according to the transmission channel information without performing blind detection on the dedicated subframes.

It should be noted that in this embodiment of the present invention, when obtaining use permission of multiple unlicensed spectrums, the base station may transmit MBMS data according to the foregoing steps by using another unlicensed spectrum.

In addition, the foregoing is merely described for a case in which a first spectrum is an unlicensed spectrum and a second spectrum is a licensed spectrum. However, persons skilled in the art should understand that this embodiment of the present invention is also applicable to a case in which both a first spectrum and a second spectrum are licensed spectrums. In addition, when both the first spectrum and the second spectrum are licensed spectrums, the base station may migrate, to the first spectrum with a relatively good resource for transmission, service data that is transmitted on the second spectrum, thereby improving spectrum utilization.

Figure 10:
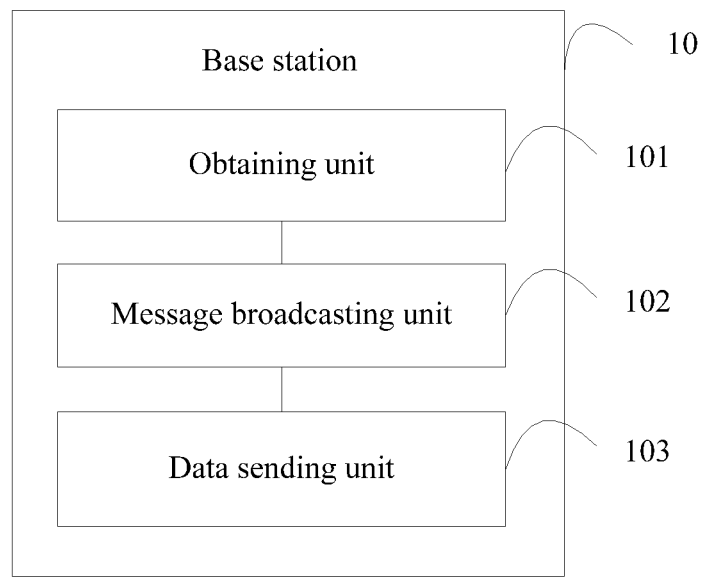
FIG. 10 is a schematic structural diagram of a base station according to an embodiment of the present invention.

An embodiment of the present invention provides a base station 100, to implement the service data transmission method shown in FIG. 3. As shown in FIG. 10, the base station 100 includes:

an obtaining unit 101, configured to obtain use permission of at least one first spectrum;

a message broadcasting unit 102, configured to broadcast a service migration message to a terminal by using a second spectrum, where the service migration message is used to instruct the terminal to receive service data on the at least one first spectrum; and a data sending unit 103, configured to send the service data to the terminal by using the at least one first spectrum.

Optionally, both the first spectrum and the second spectrum may be licensed spectrums. In this way, when a resource of the second spectrum is relatively poor, for example, radio signal strength is relatively weak, and network uplink and downlink rates are relatively low, the base station may migrate, to the first spectrum with a relatively good resource for transmission, service data that is transmitted on the second spectrum, thereby improving spectrum utilization, accelerating a service data transmission rate, and improving user experience. For details, refer to corresponding description in the method embodiment shown in FIG. 1. Details are not repeatedly described herein.

Optionally, the first spectrum is an unlicensed spectrum, and the second spectrum is a licensed spectrum. In this case, the base station may send service data to the terminal by using at least one unlicensed spectrum in the following two manners.

Manner 1: The base station sends the service data to the terminal in a subframe scheduling manner by using the at least one unlicensed spectrum.

In Manner 1, after obtaining use permission of the at least one unlicensed spectrum, the base station broadcasts the service migration message to the terminal by using a licensed spectrum. The service migration message may include frequency information of the at least one unlicensed spectrum, a cell identifier of an unlicensed cell that occupies the at least one unlicensed spectrum, and a service identifier of the service data.

Specifically, if the base station obtains use permission of M unlicensed spectrums, and M is a positive integer greater than or equal to 1, the data sending unit 103 is specifically configured to: send, to the terminal, a scheduling indication message corresponding to the service data, where the scheduling indication message includes a transmission channel identifier of the service data, and the transmission channel identifier is used to indicate a transmission channel on which the service data is transmitted; and send the service data by using a subframe on the M unlicensed spectrums.

In this way, after receiving the service migration message, the terminal listens to the unlicensed cell corresponding to the unlicensed cell identifier, and performs blind detection on a subframe on the unlicensed spectrum according to the frequency information. The blind detection performed on the subframe by the terminal is used to determine whether the subframe carries service data.

Further, after detecting, by means of blind detection, that the subframe carries service data, the terminal obtains transmission channel information on the corresponding transmission channel according to the transmission channel identifier. The transmission channel information is used to indicate a physical resource location occupied by the service data carried in the subframe, and a modulation and demodulation scheme of the service data. In this way, the terminal further decodes the data at the physical resource location according to the modulation and demodulation scheme, and obtains, from decoded data according to the service identifier, the service data required by the terminal.

In addition, when obtaining use permission of multiple unlicensed spectrums, the base station may not use all the unlicensed spectrums to send service data each time. Specifically, when the base station obtains use permission of M unlicensed spectrums, and M is a positive integer greater than 1, the data sending unit 103 is further configured to: send, to the terminal, a scheduling indication message corresponding to the service data, where the scheduling indication message includes a transmission channel identifier of the service data and a cell identifier of an unlicensed cell that occupies N unlicensed spectrums, the transmission channel identifier is used to indicate a transmission channel on which the service data is transmitted, the N unlicensed spectrums are any N unlicensed spectrums in the M unlicensed spectrums, N is a positive integer, and $1 \leq N \leq M$; and send the service data by using a subframe on the N unlicensed spectrums.

In this embodiment of the present invention, service data may also be retransmitted in Manner 1. Specifically, when the terminal does not receive or does not correctly receive service data in an unlicensed cell, the terminal may send a retransmission indication message to a licensed cell or the unlicensed cell. The retransmission indication message may include a serial number of a service data packet that is not received by the terminal, or a subframe number of service data that is not correctly received by the terminal. In this way, after receiving the retransmission indication message, the base station determines, according to the serial number or the subframe number, service data that needs to be retransmitted, and retransmits the service data to the terminal by using the licensed cell or the unlicensed cell. In this case, the scheduling indication message may further include a retransmission identifier, so that the terminal can distinguish retransmitted service data.

The base station may also retransmit the service data by using another cell other than the unlicensed cell. The another cell may be a licensed cell, or may be another unlicensed cell. The base station retransmits the service data by using the another cell, so that a problem that the terminal cannot receive data due to a "hidden node" can be resolved. For example, a terminal is simultaneously located in a first cell and a second cell, and a base station of the first cell and a base station of the second cell cannot detect existence of each other because a relatively far distance exists between the base station of the first cell and the base station of the second cell. In this case, the base station of the first cell and the base station of the second cell are hidden nodes to each other. In this way, if the first cell and the second cell simultaneously send service data to the terminal, a data conflict is caused, so that the terminal cannot receive the data. Because a time interval at which the first cell performs retransmission is the same as a time interval at which the second cell performs retransmission, if the base station of the first cell and the base station of the second cell perform retransmission by using a same cell, the terminal still cannot receive the retransmitted service data due to a data conflict. In this case, the base station may perform retransmission by using another cell, so as to resolve a hidden node problem.

According to the foregoing method for retransmitting service data by using an unlicensed cell, a packet loss rate of the terminal is reduced.

Manner 2: The data sending unit 103 is specifically configured to: send the service data to the terminal by using dedicated subframes on the at least one unlicensed spectrum, and send configuration information of the dedicated subframes and transmission channel information of the service data to the terminal.

The dedicated subframe may be a subframe that is specifically used to carry service data. For example, several continuous subframes within a time period may be regarded as dedicated subframes, or a subframe that is used to transmit service data and is indicated by configuration information may also be regarded as a dedicated subframe.

Optionally, the base station may send the configuration information of the dedicated subframes and the transmission channel information of the service data to the terminal by using the service migration message. That is, in Manner 2, the service migration message includes frequency information of the at least one unlicensed spectrum, a cell identifier of an unlicensed cell that occupies the at least one unlicensed spectrum, a service identifier of the service data, the configuration information of the dedicated subframes, and the transmission channel information of the service data.

The foregoing is merely a possible implementation of this embodiment of the present invention. After broadcasting the service migration message, the base station may also send the configuration information of the dedicated subframes and the transmission channel information of the service data to the terminal by using a subframe on a licensed spectrum or a subframe on an unlicensed spectrum. This is not limited in the present invention.

Optionally, the configuration information of the dedicated subframes includes a time period occupied by the dedicated subframes or a quantity of the dedicated subframes.

It should be noted that the base station may pre-agree with the terminal about a start location of the dedicated subframes. For example, the base station may send the configuration information and the transmission channel information of the service data by using a subframe before the dedicated subframes. After obtaining the configuration information and the transmission channel information of the service data in the subframe, the terminal directly starts to receive, from a next subframe, the dedicated subframes that occupy the corresponding time period or the corresponding quantity of the dedicated subframes, and obtains, according to the transmission channel information and the service identifier in the service migration message, the service data carried in the dedicated subframes. Alternatively, the base station may notify the terminal of a start location of the dedicated subframes each time. In this case, the configuration information further includes start location information of the dedicated subframes.

Optionally, the configuration information of the dedicated subframes includes a bitmap, and the bitmap is used to indicate a dedicated subframe that carries the service data.

Optionally, the base station adds indication information to a last subframe in the dedicated subframes. The indication message is used by the terminal to determine whether to perform blind detection on a subsequent subframe. The blind detection is used to determine whether the subsequent subframe carries new service data.

Specifically, if the indication information indicates that the base station cannot possibly send service data by using the at least one unlicensed spectrum, the terminal may not need to perform blind detection on a subframe on the at least one unlicensed spectrum. If the indication information indicates that the base station can possibly send service data by using the at least one unlicensed spectrum, the terminal may perform blind detection on a subframe on the at least one unlicensed spectrum. In this way, the base station does not need to accurately determine in advance a quantity of dedicated subframes. For a service whose data amount greatly fluctuates, such as a group Group service, the base station may set an approximate quantity of dedicated subframes. When the dedicated subframes cannot carry all data because an amount of the to-be-transmitted data is relatively large, the base station may send exceeded data by using a subsequent subframe, and add indication information to a last subframe in the dedicated subframes, to instruct the terminal to perform blind detection on the subsequent subframe, thereby avoiding subframe waste that is caused by excessive dedicated subframes when a relatively small amount of data is transmitted.

The foregoing is described by using MBMS data as an example. However, persons skilled in the art should know that the present invention is also applicable to unicast service transmission.

Further, when the use permission of the at least one unlicensed spectrum ends, the base station broadcasts a service backward migration message by using the licensed spectrum or the at least one unlicensed spectrum. The service backward migration message is used to instruct the terminal to receive service data on the licensed spectrum again.

According to the foregoing base station, the base station may transmit service data by using an unlicensed spectrum, thereby improving unlicensed spectrum utilization.

In addition, the foregoing is merely described for a case in which a first spectrum is an unlicensed spectrum and a second spectrum is a licensed spectrum. However, persons skilled in the art should understand that this embodiment of the present invention is also applicable to a case in which both a first spectrum and a second spectrum are licensed spectrums.

Based on description of the foregoing implementations, persons skilled in the art may clearly understand that, for the purpose of convenient and brief description, division of the foregoing function modules is merely used as an example for illustration. In actual application, the foregoing functions can be allocated to different function modules for implementation according to a requirement. That is, an internal structure of the apparatus is divided into different function modules to implement all or a part of the functions described above. For a detailed working process of the foregoing unit, refer to a corresponding process in the foregoing method embodiments. Details are not repeatedly described herein. In addition, the base station may also be implemented by means of cooperation of a transceiver and a processor.

Figure 11:
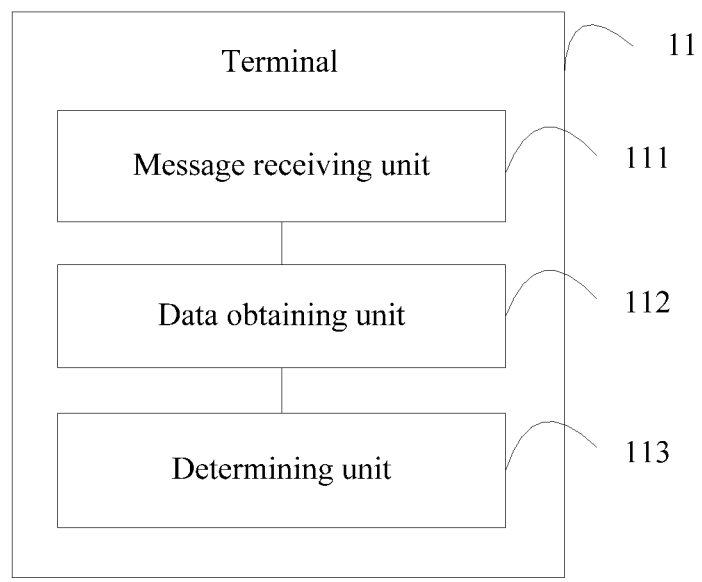
FIG. 11 is a schematic structural diagram of a terminal according to an embodiment of the present invention.

An embodiment of the present invention provides a terminal 11, to implement the service data transmission method shown in FIG. 8. As shown in FIG. 11, the terminal 11 includes:

a message receiving unit 111, configured to receive a service migration message that is broadcast by a base station by using a second spectrum, where the service migration message is used to instruct the terminal to receive service data on at least one first spectrum; and a data obtaining unit 112, configured to receive, according to the service migration message, the service data that is sent by the base station by using the at least one first spectrum.

Optionally, both the first spectrum and the second spectrum may be licensed spectrums. In this way, when a resource of the second spectrum is relatively poor, for example, radio signal strength is relatively weak, and network uplink and downlink rates are relatively low, the base station may migrate, to the first spectrum with a relatively good resource for transmission, service data that is transmitted on the second spectrum, thereby improving spectrum utilization, accelerating a service data transmission rate, and improving user experience. For details, refer to corresponding description in the method embodiment shown in FIG. 8. Details are not repeatedly described herein.

Optionally, the first spectrum is an unlicensed spectrum, and the second spectrum is a licensed spectrum. In this case, the terminal may receive, in the following two manners, service data that is sent by the base station to the terminal.

Manner 1: The terminal receives the service data that is sent by the base station in a scheduling manner by using the at least one unlicensed spectrum.

After obtaining use permission of the at least one unlicensed spectrum, the base station sends a service migration message to the terminal by using a licensed spectrum. The service migration message may include frequency information of the at least one unlicensed spectrum, a cell identifier of an unlicensed cell that occupies the at least one unlicensed spectrum, and a service identifier of the service data.

Further, if the base station obtains use permission of M unlicensed spectrums, and M is a positive integer greater than or equal to 1, the data obtaining unit 112 is specifically configured to receive, according to the service migration message, a subframe that is sent by the base station by using the M unlicensed spectrums. The message receiving unit 112 is further configured to receive a scheduling indication message sent by the base station, where the scheduling indication message includes a transmission channel identifier of the service data, and the transmission channel identifier is used to indicate a transmission channel on which the service data is transmitted. The data obtaining unit 112 is further configured to obtain, according to the scheduling indication message, the service data carried in the subframe.

The scheduling indication message may be sent by the base station by using a licensed spectrum, or may be sent by the base station by using an unlicensed spectrum.

Specifically, after receiving the service migration message, the terminal listens to the unlicensed cell corresponding to the unlicensed cell identifier, and performs blind detection on a subframe on the unlicensed spectrum according to the frequency information. After detecting, by means of blind detection, that the subframe carries service data, the terminal obtains transmission channel information on the corresponding transmission channel according to the transmission channel identifier. The transmission channel information is used to indicate a physical resource location occupied by the service data carried in the subframe, and a modulation and demodulation scheme of the service data. In this way, the terminal further decodes the data at the physical resource location according to the modulation and demodulation scheme, and obtains, from decoded data according to the service identifier, the service data required by the terminal.

It should be noted that when obtaining use permission of multiple unlicensed spectrums, the base station may not use all the unlicensed spectrums to send service data each time. Specifically, when the base station obtains use permission of M unlicensed spectrums, and M is a positive integer greater than 1, the message receiving unit 111 is specifically configured to receive a scheduling indication message sent by the base station. The scheduling indication message includes a transmission channel identifier of the service data and a cell identifier of an unlicensed cell that occupies N unlicensed spectrums. The transmission channel identifier is used to indicate a transmission channel on which the service data is transmitted. The N unlicensed spectrums are any N unlicensed spectrums in the M unlicensed spectrums, N is a positive integer, and 1≤N≤M. The data obtaining unit 112 is further configured to: receive, according to the service migration message, a subframe that is sent by the base station by using the N unlicensed spectrums; and obtain, according to the scheduling indication message, the service data carried in the subframe on the N unlicensed spectrums.

That is, the cell identifier of the unlicensed cell in the service migration message may refer to a cell identifier of an unlicensed cell in which the base station may transmit service data. For example, if the base station obtains use permission of a first unlicensed spectrum and use permission of a second unlicensed spectrum, the cell identifier carried in the service migration message is a cell identifier of an unlicensed cell that occupies the first unlicensed spectrum and a cell identifier of an unlicensed cell that occupies the second unlicensed spectrum. However, the cell identifier in the scheduling indication message may be a cell identifier of an unlicensed cell in which service data is currently sent, and the cell identifier in the scheduling indication message may be a cell identifier of an unlicensed cell that occupies the first unlicensed spectrum and/or a cell identifier of an unlicensed cell that occupies the second unlicensed spectrum.

Optionally, in Manner 1, when the terminal does not receive or does not correctly receive service data in an unlicensed cell, the terminal may send a retransmission indication message to a licensed cell or the unlicensed cell. The retransmission indication message may include a serial number of a service data packet that is not received by the terminal, or a subframe number of service data that is not correctly received by the terminal. In this way, after receiving the retransmission indication message, the base station determines, according to the serial number or the subframe number, service data that needs to be retransmitted, and retransmits the service data to the terminal by using the licensed cell or the unlicensed cell. In this case, the scheduling indication message may further include a retransmission identifier, so that the terminal can distinguish retransmitted service data.

The base station may also retransmit the service data by using another cell other than the unlicensed cell. The another cell may be a licensed cell, or may be another unlicensed cell. The base station retransmits the service data by using the another cell, so that a problem that the terminal cannot receive data due to a "hidden node" can be resolved. For example, a terminal is simultaneously located in a first cell and a second cell, and a base station of the first cell and a base station of the second cell cannot detect existence of each other because a relatively far distance exists between the base station of the first cell and the base station of the second cell. In this case, the base station of the first cell and the base station of the second cell are hidden nodes to each other. In this way, if the first cell and the second cell simultaneously send service data to the terminal, a data conflict is caused, so that the terminal cannot receive the data. Because a time interval at which the first cell performs retransmission is the same as a time interval at which the second cell performs retransmission, if the base station of the first cell and the base station of the second cell perform retransmission by using a same cell, the terminal still cannot receive the retransmitted service data due to a data conflict. In this case, the base station may perform retransmission by using another cell, so as to resolve a hidden node problem.

According to the foregoing method for retransmitting service data by using an unlicensed cell, a packet loss rate of the terminal is reduced.

Manner 2: The message receiving unit 111 is further configured to receive configuration information of dedicated subframes and transmission channel information of the service data that are sent by the base station, and the data obtaining unit 112 is specifically configured to obtain, according to the service migration message, the configuration information of the dedicated subframes, and the transmission channel information of the service data, the service data carried in the dedicated subframes on the at least one unlicensed spectrum.

The dedicated subframe may be a subframe that is specifically used to carry service data. For example, several continuous subframes within a time period may be regarded as dedicated subframes, or a subframe that is used to transmit service data and is indicated by configuration information may also be regarded as a dedicated subframe.

Optionally, the base station may send the configuration information of the dedicated subframes and the transmission channel information of the service data to the terminal by using the service migration message. That is, in Manner 2, the service migration message includes frequency information of the at least one unlicensed spectrum, a cell identifier of an unlicensed cell that occupies the at least one unlicensed spectrum, a service identifier of the service data, the configuration information of the dedicated subframes, and the transmission channel information of the service data.

The foregoing is merely a possible implementation of this embodiment of the present invention. After broadcasting the service migration message, the base station may also send the configuration information of the dedicated subframes and the transmission channel information of the service data to the terminal by using a subframe on a licensed spectrum or a subframe on an unlicensed spectrum. This is not limited in the present invention.

Optionally, if all the dedicated subframes carry the service data, the configuration information of the dedicated subframes includes a time period occupied by the dedicated subframes or a quantity of the dedicated subframes.

It should be noted that the base station may pre-agree with the terminal about a start location of the dedicated subframes. For example, the base station may send the configuration information and the transmission channel information of the service data by using a subframe before the dedicated subframes. After obtaining the configuration information and the transmission channel information of the service data in the subframe, the terminal directly starts to receive, from a next subframe, the dedicated subframes that occupy the corresponding time period or the corresponding quantity of the dedicated subframes, and obtains, according to the transmission channel information and the service identifier in the service migration message, the service data carried in the dedicated subframes. Alternatively, the base station may notify the terminal of a start location of the dedicated subframes each time. In this case, the configuration information further includes start location information of the dedicated subframes.

Optionally, the configuration information of the dedicated subframes includes a bitmap, and the bitmap is used to indicate a dedicated subframe that carries the service data.

Optionally, the terminal further includes a determining unit 113, configured to determine, according to indication information carried in a last subframe in the dedicated subframes, whether to perform blind detection on a subsequent subframe, where the blind detection is used to determine whether the subsequent subframe carries new service data.

Specifically, if the indication information indicates that the base station cannot possibly send service data by using the at least one unlicensed spectrum, the terminal may not need to perform blind detection on a subframe on the at least one unlicensed spectrum. If the indication information indicates that the base station can possibly send service data by using the at least one unlicensed spectrum, the terminal may perform blind detection on a subframe on the at least one unlicensed spectrum. In this way, the base station does not need to accurately determine in advance a quantity of dedicated subframes. For a service whose data amount greatly fluctuates, such as a group Group service, the base station may set an approximate quantity of dedicated subframes. When the dedicated subframes cannot carry all data because an amount of the to-be-transmitted data is relatively large, the base station may send exceeded data by using a subsequent subframe, and add indication information to a last subframe in the dedicated subframes, to instruct the terminal to perform blind detection on the subsequent subframe, thereby avoiding subframe waste that is caused by excessive dedicated subframes when a relatively small amount of data is transmitted.

Further, the terminal receives a service backward migration message that is broadcast by the base station by using the licensed spectrum or the at least one unlicensed spectrum, and receives service data on the licensed spectrum according to the service backward migration message again.

In addition, the foregoing is merely described for a case in which a first spectrum is an unlicensed spectrum and a second spectrum is a licensed spectrum. However, persons skilled in the art should understand that this embodiment of the present invention is also applicable to a case in which both a first spectrum and a second spectrum are licensed spectrums.

Based on description of the foregoing implementations, persons skilled in the art may clearly understand that, for the purpose of convenient and brief description, division of the foregoing function modules is merely used as an example for illustration. In actual application, the foregoing functions can be allocated to different function modules for implementation according to a requirement. That is, an internal structure of the apparatus is divided into different function modules to implement all or a part of the functions described above. For a detailed working process of the foregoing unit, refer to a corresponding process in the foregoing method embodiments. Details are not repeatedly described herein. In addition, the terminal may also be implemented by means of cooperation of a transceiver and a processor.

Figure 12:
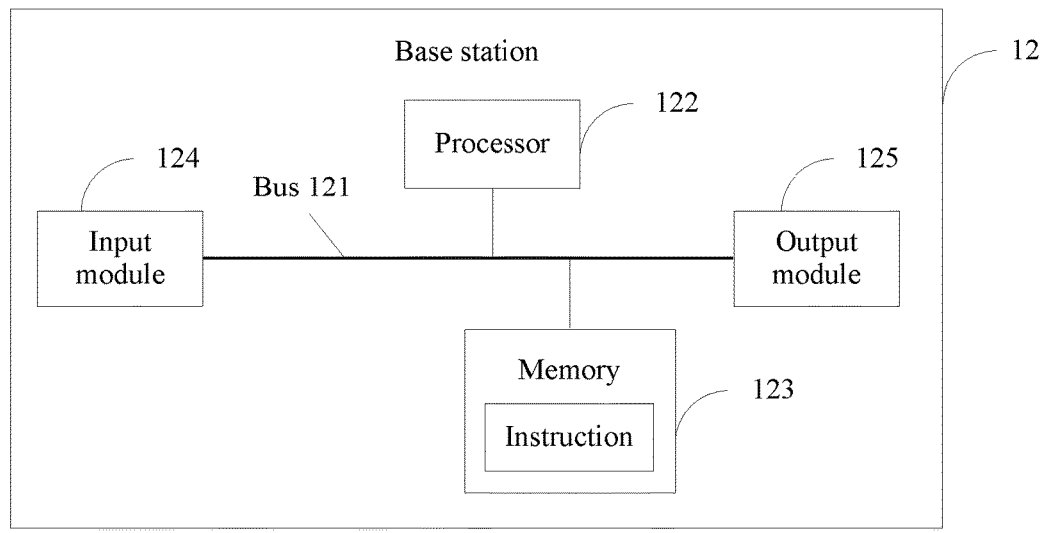
FIG. 12 is a schematic structural diagram of another base station according to an embodiment of the present invention.

An embodiment of the present invention provides another base station 12. As shown in FIG. 12, the base station 12 includes:

a bus 121, and a processor 122, a memory 123, an input module 124, and an output module 125 that are connected to the bus. The processor 122, the memory 123, the input module 124, and the output module 125 communicate with each other by using the bus 121. The input module 124 and the output module 125 are configured to interact with an external device.

The processor 122 may be a multi-core central processing unit CPU, or an application-specific integrated circuit ASIC (Application Specific Integrated Circuit), or one or more integrated circuits configured to implement embodiments of the present invention.

The memory 123 is configured to store an instruction, where the program code includes a computer operation instruction and a network flow graph. The memory 123 may include a high-speed RAM memory, and may further include a nonvolatile memory (non-volatile memory), such as at least one magnetic disk memory. The memory 123 may be a memory array.

The base station 12 implements all method embodiments shown in FIG. 3 by means of cooperation of the processor 122, the input module 124, and the output module 125. For details, refer to corresponding description in the method embodiments corresponding to FIG. 3. Details are not repeatedly described herein.

Figure 13:
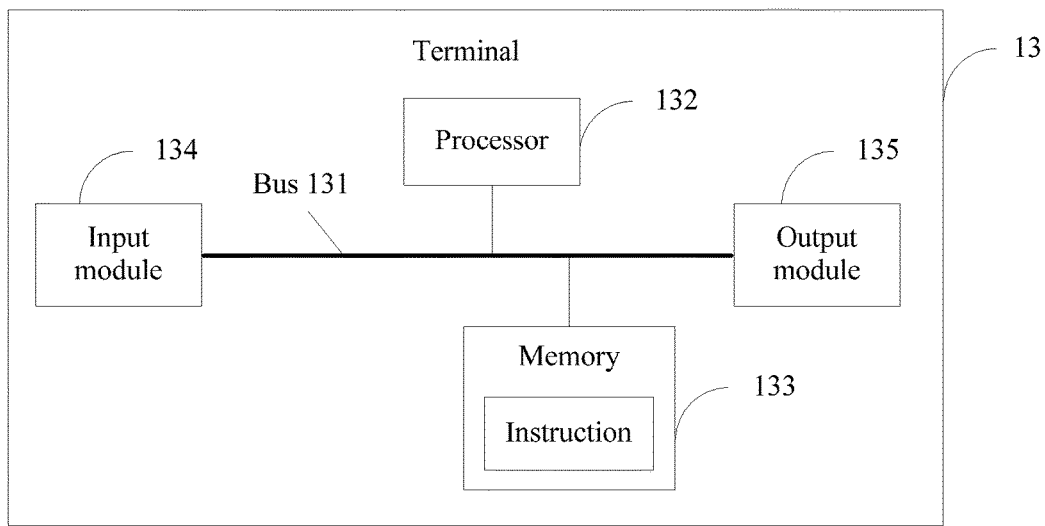
FIG. 13 is a schematic structural diagram of another terminal according to an embodiment of the present invention.

An embodiment of the present invention provides another terminal 13. As shown in FIG. 13, the base station 13 includes:

a bus 131, and a processor 132, a memory 133, an input module 134, and an output module 135 that are connected to the bus. The processor 132, the memory 133, the input module 134, and the output module 135 communicate with each other by using the bus 131. The input module 134 and the output module 125 are configured to interact with an external device.

The processor 132 may be a multi-core central processing unit CPU, or an application-specific integrated circuit ASIC (Application Specific Integrated Circuit), or one or more integrated circuits configured to implement embodiments of the present invention.

The memory 133 is configured to store an instruction, where the program code includes a computer operation instruction and a network flow graph. The memory 133 may include a high-speed RAM memory, and may further include a nonvolatile memory (non-volatile memory), such as at least one magnetic disk memory. The memory 133 may be a memory array.

The terminal 13 implements all method embodiments shown in FIG. 8 by means of cooperation of the processor 132, the input module 134, and the output module 135. For details, refer to corresponding description in the method embodiments corresponding to FIG. 8. Details are not repeatedly described herein.

In the several embodiments provided in this application, it should be understood that the disclosed apparatus and method may be implemented in another manner. For example, the described apparatus embodiment is merely an example. For example, the unit division is merely logical function division and may be other division in actual implementation. For example, multiple units or components may be combined or integrated into another system, or some features may be ignored or not performed.

In addition, in the apparatus in the embodiments of the present invention, functional units may be integrated into one processing unit, or each of the units may exist alone physically, or two or more units may be integrated into one unit. The units may be implemented in a form of hardware, or may be implemented in a form of hardware in addition to a software functional unit.

All or some of steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a ROM (read only memory), a RAM (random access memory), a magnetic disk, or an optical disc.

The foregoing descriptions are merely specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A service data transmission method, comprising:
    obtaining, by a base station, use permission of M unlicensed spectrums, M is a positive integer greater than 1;
    broadcasting, by the base station, a service migration message to a terminal by using a licensed spectrum, wherein the service migration message is used to instruct the terminal to receive service data on at least one of the M unlicensed spectrums;
    sending, by the base station, configuration information of dedicated subframes on the at least one of the M unlicensed spectrums and transmission channel information of the service data to the terminal;
    sending, by the base station, the service data to the terminal by using the dedicated subframes on the at least one of the M unlicensed spectrums;
    sending, by the base station to the terminal, a scheduling indication message corresponding to the service data, wherein the scheduling indication message comprises a transmission channel identifier of the service data and a cell identifier of an unlicensed cell that occupies N unlicensed spectrums, the transmission channel identifier is used to indicate a transmission channel on which the service data is transmitted, the N unlicensed spectrums are any N unlicensed spectrums in the M unlicensed spectrums, N is a positive integer, and $1 \leq N \leq M$; and
    sending, by the base station, the service data by using a subframe on the N unlicensed spectrums.

2. The method according to claim 1, wherein the service migration message comprises frequency information of the at least one of the M unlicensed spectrums, a cell identifier of a cell that occupies the at least one of the M unlicensed spectrums, and a service identifier of the service data.

3. The method according to claim 1, further comprising:
    sending, by the base station to the terminal, a scheduling indication message corresponding to the service data, wherein the scheduling indication message comprises a transmission channel identifier of the service data, and the transmission channel identifier is used to indicate a transmission channel on which the service data is transmitted; and
    sending, by the base station, the service data by using a subframe on the at least one of the M unlicensed spectrums.

4. A service data transmission method, comprising:
receiving, by a terminal, a service migration message that is broadcast by a base station by using a licensed spectrum, wherein the service migration message is used to instruct the terminal to receive service data on at least one of M unlicensed spectrums, and wherein use permission of the M unlicensed spectrums is obtained by the base station and M is a positive integer greater than 1;
receiving, by the terminal, configuration information of dedicated subframes on the at least one of the M unlicensed spectrums and transmission channel information of the service data that are sent by the base station;
obtaining, by the terminal according to the service migration message, the configuration information of the dedicated subframes, and the transmission channel information of the service data, the service data carried in the dedicated subframes on the at least one of the M unlicensed spectrums;
receiving, by the terminal, a scheduling indication message corresponding to the service data sent by the base station, wherein the scheduling indication message comprises a transmission channel identifier of the service data and a cell identifier of an unlicensed cell that occupies N unlicensed spectrums, the transmission channel identifier is used to indicate a transmission channel on which the service data is transmitted, the N unlicensed spectrums are any N unlicensed spectrums in the M unlicensed spectrums, N is a positive integer, and 1≤W≤M; and
receiving, by the terminal, the service data sent by the base station by using a subframe on the N unlicensed spectrums.

5. The method according to claim 4, wherein the service migration message comprises frequency information of the at least one of the M unlicensed spectrums, a cell identifier of a cell that occupies the at least one of the M unlicensed spectrums, and a service identifier of the service data.

6. A base station, comprising:
a memory; and
a processor coupled to the memory and configured to:
obtain use permission of M unlicensed spectrums, M is a positive integer greater than 1;
broadcast a service migration message to a terminal by using a licensed spectrum, wherein the service migration message is used to instruct the terminal to receive service data on the at least one of the M unlicensed spectrums;
send configuration information of dedicated subframes on at least one of the M unlicensed spectrums and transmission channel information of the service data to the terminal;
send the service data to the terminal by using the dedicated subframes on the at least one of the M unlicensed spectrums;
send to the terminal, a scheduling indication message corresponding to the service data, wherein the scheduling indication message comprises a transmission channel identifier of the service data and a cell identifier of an unlicensed cell that occupies N unlicensed spectrums, the transmission channel identifier is used to indicate a transmission channel on which the service data is transmitted, the N unlicensed spectrums are any N unlicensed spectrums in the M unlicensed spectrums, N is a positive integer, and 1≤N≤M; and
send the service data by using a subframe on the N unlicensed spectrums.

7. The base station according to claim 6, wherein the service migration message comprises frequency information of the at least one of the M unlicensed spectrums, a cell identifier of a cell that occupies the at least one of the M unlicensed spectrums, and a service identifier of the service data.

8. The base station according to claim 6, wherein the processor is further configured to:
send a scheduling indication message corresponding to the service data, wherein the scheduling indication message comprises a transmission channel identifier of the service data, and the transmission channel identifier is used to indicate a transmission channel on which the service data is transmitted; and
send the service data by using a subframe on the M unlicensed spectrums.

9. A terminal, comprising:
a memory; and
a processor coupled to the memory and configured to:
receive a service migration message that is broadcast by a base station by using a licensed spectrum, wherein the service migration message is used to instruct the terminal to receive service data on at least one of M unlicensed spectrums, and wherein use permission of the M unlicensed spectrums is obtained by the base station and M is a positive integer greater than 1;
receive configuration information of dedicated subframes on the at least one of the M unlicensed spectrums and transmission channel information of the service data that are sent by the base station;
obtain according to the service migration message, the configuration information of the dedicated subframes, and the transmission channel information of the service data, the service data carried in the dedicated subframes on the at least one of the M unlicensed spectrums;
receive a scheduling indication message corresponding to the service data sent by the base station, wherein the scheduling indication message comprises a transmission channel identifier of the service data and a cell identifier of an unlicensed cell that occupies N unlicensed spectrums, the transmission channel identifier is used to indicate a transmission channel on which the service data is transmitted, the N unlicensed spectrums are any N unlicensed spectrums in the M unlicensed spectrums, N is a positive integer, and 1≤N≤M; and
receive the service data sent by the base station by using a subframe on the N unlicensed spectrums.

10. The terminal according to claim 9, wherein the service migration message comprises frequency information of the at least one of the M unlicensed spectrums, a cell identifier of a cell that occupies the at least one of the M unlicensed spectrums, and a service identifier of the service data.

11. The terminal according to claim 9, wherein the processor is further configured to: receive a scheduling indication message sent by the base station, wherein the scheduling indication message comprises a transmission channel identifier of the service data, and the transmission channel identifier is used to indicate a transmission channel on which the service data is transmitted; and receive, according to the service migration message, a subframe that is sent by the base station by using the M unlicensed spectrums; and
obtain, according to the scheduling indication message, the service data carried in the subframe.

12. The terminal according to claim 9, wherein the processor is further configured to determine, according to indication information carried in a last subframe in the dedicated subframes, whether to perform blind detection on a subsequent subframe, wherein the blind detection is used to determine whether the subsequent subframe carries new service data.

13. The method according to claim 1, wherein the use permission is for a time period during which the base station can use the at least one of the M unlicensed spectrums.

14. The method according to claim 1, wherein the dedicated subframes are used specifically to carry the service data.

15. The method according to claim 1, wherein the configuration information of the dedicated subframes includes a time period occupied by the dedicated subframes or a quantity of the dedicated subframes.

16. The method according to claim 15, wherein the configuration information includes a start location information of the dedicated subframes.

17. The method according to claim 1, wherein the base station adds indication information to a last subframe of the dedicated subframes that is used by the terminal to determine whether to perform blind detection on a subsequent subframe.

* * * * *

UNITED STATES PATENT AND TRADEMARK OFFICE
CERTIFICATE OF CORRECTION

PATENT NO. : 10,244,400 B2
APPLICATION NO. : 15/667797
DATED : March 26, 2019
INVENTOR(S) : Qufang Huang et al.

Page 1 of 1

It is certified that error appears in the above-identified patent and that said Letters Patent is hereby corrected as shown below:

In the Claims

Column 35, Line 31, In Claim 4, delete "$1 \leq W \leq M$;" and insert --$1 \leq N \leq M$;--, therefor.

Signed and Sealed this
Twelfth Day of November, 2019

Andrei Iancu
*Director of the United States Patent and Trademark Office*